United States Patent [19]

Yamaoka et al.

[11] Patent Number: 4,519,942
[45] Date of Patent: May 28, 1985

[54] SEMICONDUCTIVE CERAMIC COMPOSITIONS WITH A NONLINEAR VOLT-AMPERE CHARACTERISTIC, AND PROCESS FOR PREPARING COHERENT BODIES OF SUCH COMPOSITIONS

[75] Inventors: Nobutatsu Yamaoka, Harunamachi; Akira Tsukada, Takasaki; Kazuo Sasazawa, Maebashi, all of Japan

[73] Assignee: Taiyo Yuden Co., Ltd., Tokyo, Japan

[21] Appl. No.: 280,801

[22] Filed: Jul. 6, 1981

[30] Foreign Application Priority Data

Jul. 30, 1980 [JP]  Japan .................................. 55-104713

[51] Int. Cl.$^3$ .............................................. H01B 1/06
[52] U.S. Cl. .................................... 252/520; 252/521; 252/518
[58] Field of Search ............... 252/520, 521, 518, 62.3, 252/62.3 R, 62.3 BT, 62.3 ZB, 62.3 ZT; 338/20, 21; 501/134, 135, 136, 138, 139

[56] References Cited

U.S. PATENT DOCUMENTS

| | | | |
|---|---|---|---|
| 3,933,668 | 1/1976 | Takahashi et al. | 252/63.5 |
| 4,191,665 | 3/1980 | Mandai et al. | 252/520 |
| 4,283,753 | 8/1981 | Burn | 252/520 |
| 4,292,209 | 9/1981 | Marchant et al. | 252/520 |
| 4,347,167 | 8/1982 | Payne et al. | 252/520 |
| 4,362,637 | 12/1982 | Matsuo et al. | 252/520 |

*Primary Examiner*—Josephine L. Barr
*Attorney, Agent, or Firm*—Woodcock Washburn Kurtz Mackiewicz & Norris

[57] ABSTRACT

Ceramic materials suitable for use in varistors, enabling the same to function both as such and as capacitors. The ceramic compositions comprise a major proportion of $SrTiO_3$, the balance being (1) one or more of $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$, and $Sm_2O_3$, for making the compositions semiconductive, and (2) one or more of $V_2O_5$, $Cr_2O_3$, $CuO$, $Cu_2O$, $MoO_3$, and $MnO_2$, for improving the nonlinear volt-ampere characteristic of the compositions. If desired, for improving the coherency of bodies molded from the compositions, there can be added one or more of $GeO_2$, $ZnO$, $B_2O_3$, and $PbO$. For use as varistors the mixture of the above ingredients, all in finely divided form and made coherent with a binder, is molded into desired shape under pressure. The moldings are first fired in a nonoxidative atmosphere and then further heated in an oxidative atmosphere. Electrodes can be formed as by silver painting.

2 Claims, 9 Drawing Figures

SEMICONDUCTIVE CERAMIC COMPOSITIONS WITH A NONLINEAR VOLT-AMPERE CHARACTERISTIC, AND PROCESS FOR PREPARING COHERENT BODIES OF SUCH COMPOSITIONS

BACKGROUND OF THE INVENTION

This invention relates to ceramic materials particularly well suited for use in semiconductor devices having a nonlinear volt-ampere characteristic. The invention also concerns a process for the fabrication of coherent bonded bodies of such materials.

Semiconductor devices with a nonlinear volt-ampere characteristic find extensive use in electric circuits for the absorption of abnormal voltages, suppression of noise, and elimination of sparks. Commonly referred to as varistors, as hereinafter so called in this specification, such semiconductor devices have been fabricated typically from silicon (using the pn-junctions of silicon semicondcutors), silicon carbide (SiC), zinc oxide (ZnO), stannic oxide ($SnO_2$), and titanium dioxide ($TiO_2$).

The pn-junction silicon varistors make use of forward voltage rises, so that they offer a varistor voltage of as low as 0.6 volt (V) or so per pn-junction. For higher varistor voltages, therefore, a plurality of pn-junction silicon chips must be interconnected in series. As regards the SiC varistors, the nonlinearity coefficient $\alpha$ of their volt-ampere characteristic is as low as two or three in a voltage range of 3–20 V. Another disadvantage is that SiC cannot possibly be sintered into annular or other more or less complex shape with sufficient coherency. The ZnO varistors have a high nonlinearity coefficient in a voltage range of over 30 V, but it becomes as low as about two in a low voltage range of 3–20 V. The nonlinearity coefficient of the $SnO_2$ varistors is higher, being up to about five, in the voltage range of 3–20 V. This advantage is offset, however, by the poor sinterability, expensiveness, and low moisture-withstanding ability of the material. Moreover, since the $SnO_2$ varistors function as such by making use of the PN-junctions at the interfaces between the electrodes and the semiconductor bodies, their physical properties tend to deteriorate from voltage pulses. The $TiO_2$ varistors can be molded and sintered into any desired shape, but their nonlinearity coefficient is only two to four in a voltage range of 20–30 V. Additionally, their varistor voltage varies with temperature (temperature characteristic) at a rate ranging from $-0.5\%$ to $0.7\%$ per °C., and they are easy to overheat while handling large power.

Another known varistor material being studied is barium titanate ($BaTiO_3$). The $BaTiO_3$ varistors utilize the PN-junctions at the interfaces between the electrodes and the semiconductor bodies, just like the $SnO_2$ varistors, so that they possess drawbacks similar to those pointed out in connection with the $SnO_2$ varistors.

For the purposes of the absorption of abnormal voltages and the elimination of noise and sparks, the parallel connections of varistors and capacitors have hitherto served better than varistors only, as is well known to the specialists. No ceramic composition having both functions has so far been discovered, as far as the applicant is aware. Such a material will significantly contribute to the miniaturization and cost reduction of electrical equipment.

U.S. Pat. No. 3,933,668 issued to Takahashi et al. on Jan. 20, 1976, describes and claims a ferroelectric ceramic compound in a perovskite structure, composed principally of strontium titanate ($SrTiO_3$). This known ceramic material is well suited for use in capacitors. The high resistance offered by the particles constituting the ceramic, however, practically inhibits its use in varistors. Another disadvantage of the known $SrTiO_3$ ceramic is easy deterioration of electrical properties due to voltage pulses

SUMMARY OF THE INVENTION

The present invention seeks to combine both varistor and capacitor functions in a single class of semiconductive ceramic compositions, and to provide such compositions themselves and a process for the fabrication of coherent bonded bodies of such compositions.

The invention also seeks to provide semiconductive ceramic material which are capable of providing such a low range of varistor voltages as, say, from three to 100 V, which are little affected physically by voltage pulses in their use in semiconductor devices, and which, manufactured by the inventive method, hardly fluctuate in electrical properties.

Briefly, the invention provides a semiconductive ceramic composition comprising: (1) from about 90.000 to about 99.989 mole percent $SrTiO_3$ (hereinafter referred to as the first or main ingredient); (2) from about 0.001 to about 5.000 mole percent of at least one metal oxide (the second ingredient), for improving the semiconductivity of the composition, which is selected from the group of niobium oxide ($Nb_2O_5$), tantalum oxide ($Ta_2O_5$), tungstic oxide ($WO_3$), lanthanum oxide ($La_2O_3$), ceric oxide ($CeO_2$), neodymium oxide ($Nd_2O_3$), praseodymia ($Pr_6O_{11}$), dysprosium oxide ($Dy_2O_3$), yttrium oxide ($Y_2O_3$), and samarium oxide ($Sm_2O_3$); and (3) from about 0.010 to about 5.000 mole percent of at least one other metal oxide (the third ingredient), for improving the nonlinear volt-ampere characteristic of the composition, which is selected from the group of vanadium pentoxide ($V_2O_5$), chromic oxide ($Cr_2O_3$), black copper oxide (CuO), red copper oxide ($Cu_2O$), molybdenum trioxide ($MoO_3$), and manganese dioxide ($MnO_2$).

Hereinafter in this specification and in the claims appended thereto, all percentages are molar unless otherwise specified.

The exact proportion of each of the at least three ingredients of the ceramic composition according to the invention depends on those of the others. Preferably, the main ingredient is used in a range of about 97.7–99.1%, the second ingredient in a range of about 0.3–1.0%, and the third ingredient in a range of about 0.1–0.3%, in proportions.

In the above described ceramic composition according to the invention, the addition of at least one of the third group of ingredients ($V_2O_5$, $Cr_2O_3$, CuO, $Cu_2O$, $MoO_3$, and $MnO_2$) to the first and second ingredients serves to give the material a markedly nonlinear volt-ampere characteristic, or voltage-dependent nonlinear resistance. The crystal system of the material is in a ferroelectric perovskite structure, so that it offers a high electrostatic capacitance, making it possible to provide semiconductor devices integrally combining the functions of both varistor and capacitor.

It is reasoned that the ceramic materials formulated in accordance with the invention derive their varistor-like characteristics from the PN-junctions between their constituent particles, with the N-type semiconductor particles of, principally, the first and second ingredients surrounded by the third ingredient of P type or of substantially P type. Consequently, compared with the known varistors having the PN-junctions formed between the ceramic bodies and the electrodes, the varistors incorporating the ceramic materials of this invention will suffer less from voltage pulses. A further advantage of the ceramic compositions according to the invention is the inexpensiveness of their main ingredient, $SrTiO_3$, making possible the provision of high-quality varistor ceramics at low costs.

According to another aspect of the invention the above compositions of at least three ingredients are admixed with at least one still other metal oxide (hereinafter referred to as the fourth ingredient) with a view to higher coherency of the ceramic bodies prepared from the compositions. The fourth ingredient is selected from the group of germanium dioxide ($GeO_2$), zinc oxide (ZnO), boric oxide ($B_2O_3$), and litharge (PbO). The fourth ingredient serves to make the particles of the sintered ceramic bodies from about 20 to 40 microns in size, and further to improve the voltage rises of their V-I curves and to reduce fluctuations in the nonlinearity coefficient. The proportion of the fourth ingredient, dependent on those of the other ingredients, normally ranges from about 0.010% to about 4.000%, preferably from about 0.5% to about 1.0%. When a ceramic composition contains from about 0.010 to about 4.000% of the fourth ingredient, the amount of the first ingredient is correspondingly reduced to a range of about 86.000–99.979%.

For the fabrication of coherent bonded bodies of the first described composition (having no fourth ingredient) by the method of this invention, $SrTiO_3$ and at least two selected metal oxides of the prescribed proportions, all in finely divided form, are blended together and admixed with an organic binder. The blended mixture is molded into desired shape, such as that of a disc, at pressures ranging from about 500 to about 2000 $kg/cm^2$. The molding is first fired in a temperature range of about 1300°–1500° C. in a nonoxidative (i.e., reductive or neutral) atmosphere and then further heated in a temperature range of about 800°–1300° C. in a oxidative atmosphere.

If the composition includes a fourth ingredient or ingredients, the temperature of the oxidative heat treatment of the fired molding is selected from a range of about 900°–1300° C. In other respects, coherent bodies of this four-ingredient composition can be formed by the same method as are those of the three-ingredient composition.

The ceramic bodies manufactured by the methods of this invention are remarkably well suited for varistors, besides being notable for their high abilities of absorbing abnormal voltages in use. Subsequently electroded, the ceramic bodies find use as varistors.

The above and other features and advantages of this invention will become more apparent, and the invention itself will best be understood, from the following description and appended claims taken together with the attached drawings.

DETAILED DESCRIPTION

Figure 1:
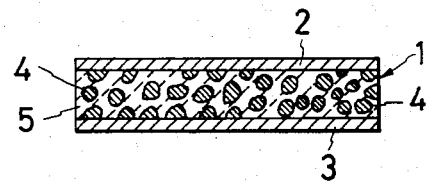
FIG. 1 is a schematic sectional view of a varistor incorporating a ceramic body formulated in accordance with the invention.

The compositions of the semiconductive ceramic materials according to this invention are as set forth in the foregoing summary of the invention. The fabrication of coherent bonded bodies of such compositions, as in the form of discs for use in varistors, starts with the preparation of $SrTiO_3$, the main ingredient, which occupies a major proportion in all the possible combinations of ingredients in accordance with the invention. This main ingredient is usually prepared from strontium carbonate ($SrCO_3$) and titanium dioxide ($TiO_2$), proportioned to unite into $SrTiO_3$. $SrCO_3$ and $TiO_2$ do so by being fired at temperatures ranging from 1050° to 1200° C. for three hours.

If the composition is to include no fourth ingredient, from about 90.000 to about 99.989% $SrTiO_3$, prepared as above, is combined with about 0.001–5.000% of at least one metal oxide (second ingredient) selected from the group of $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$, and $Sm_2O_3$, and with about 0.010–5.000% of at least one other metal oxide (third ingredient) selected from the group of $V_2O_5$, $CrO_3$, CuO, $Cu_2O$, $MoO_3$, and $MnO_2$. The combination of at least three ingredient is pulverized and intimately intermingled by being placed in a ball mill for 10 hours or so. The blended mixture of finely divided form is then admixed with 5–10 percent by weight of an organic binder, normally polyvinyl alcohol. This admixture is molded into disc-like or other desired shaped by pressing at about 500–2000 kg/cm$^2$.

Then the moldings are fired in a temperature range of about 1300°–1500° C., preferably about 1350°–1420° C., for 1–6 hours in a nonoxidative atmosphere. The total firing time, inclusive of the time for the buildup and drop of the firing temperature in the furnace, may be from 24 to 48 hours. The firing atmosphere is reductive for the better results, consisting for example of 95 percent by volume of molecular nitrogen ($N_2$) and five percent by volume of molecular hydrogen ($H_2$). The fired moldings are put to oxidative heat treatment (reoxidizing treatment), by being heated in a temperature range of about 800°–1300° C., preferably about 800°–1170° C., for 0.5–6.0 hours in an oxidative atmosphere. The total time of such oxidative heat treatment, inclusive of the time for the buildup and drop of the heating temperature in the furnace, may range from four to eight hours. Thus are completed the desired ceramic bodies, which can be put to use as varistors on being electroded, as by silver painting and baking.

In the EXAMPLES of the invention presented subsequently, all but $CrO_3$ of the listed metal oxides are used as such as starting materials. All that is required for the attainment of the purposes of this invention, however, is that the completed ceramic bodies contain the selected metal oxides. The starting materials may therefore be not necessarily in the form of metal oxides but of, for example, metallic elements, carbonates, hydroxides, oxalates, etc. To give more specific examples, the first ingredient may be formed from starting substances of strontium and titanium; the second ingredient from such starting substances as $Nb(Hd_2O_4)_5$, $La_2(C_2O_4)_3$, $La_2(CO_3)_3$, $Ce_2(C_3O_4)_3$, $Ce_2(CO_3)_3$, $Pr_2(C_2O_4)_3$, $Nd_2(C_2O_4)_3$, $Nd_2(CO_3)_3$, $Sm_2(C_2O_4)_3$, $Sm_2(CO_3)_3$, $Dy_2(C_2O_4)_3$, $Dy_2(CO_3)_3$, and $Y_2(CO_3)_3$; and the third ingredient from such starting substances as $CuCO_3$, $CuC_2O_4$, $CuCN$, $Cu_2S$, $Cr_2(CH_3COO)_3$, $Cr_2(SO_3)_3$, $V_2S_3$, $Mo(OH)_3$, $Mo(OH)_5$, $MnCO_3$, and $MnC_2O_4$.

The invention also dictates the use, in combination with the first, second and third ingredients, of at least one additional metal oxide selected from the group of $GeO_2$, $ZnO$, $B_2O_3$, and $PbO$. The metal oxide chosen as the fourth ingredient is also required to exist as such in the completed ceramics, so that it may be formed from such starting substances as $Ge(OH)_2$, $ZnC_2O_4$, $5ZnO_2 \cdot CO_3 4H_2O$, $PbC_2O_4$, and $(PbCO_3)_2Pb(OH)_2$.

The following EXAMPLES will provide further details of the compositions and manufacturing methods of the ceramic materials in accordance with the invention, as well as the characteristics of varistors incorporating the ceramic materials.

EXAMPLE 1

$SrCO_3$ and $TiO_2$, proportioned to combine into $SrTiO_3$, were fired in a temperature range of 1050°–1200° C. for three hours. The fired substances were pulverized by means of a crusher, thus providing $SrTiO_3$ as the first ingredient of the desired ceramic materials. This first ingredient was combined with $CeO_2$ as the second ingredient and $V_2O_5$ as the third ingredient, in various proportions set forth in TABLE 1, wherein the Test Numbers refer to the combinations of the three ingredients in various proportions.

Each combination of the three ingredients, which were all in finely divided form, was then admixed with 5–10 wt.% polyvinyl alcohol, an organic binder. The admixtures were molded at pressures ranging from 500 to 2000 kg/cm$^2$ into the form of discs each sized to have a diameter of 5 millimeters (mm) and a thickness of 0.8 mm on firing.

Then the moldings were fired for three hours at a temperature of 1390° C., by being placed within a furnace for a total of 32 hours, in a reductive atmosphere of 95 vol. % $N_2$ and five vol. % $H_2$. The firing temperature could be anywhere between about 1300° and about 1500° C., and the firing time could be from one to six hours depending upon the firing temperature selected. Then, in order to control the varistor voltage (rising voltage of the voltage-current curve) of the end products, the fired moldings were treated at a temperature of 900° C. for two hours in an oxidative atmosphere of air, by being placed within a furnace for a total of six hours. This oxidizing heat treatment could be effected in a temperature range of about 800–1300° C., for a length of time ranging from about 0.5 to 6.0 hours depending upon the temperature.

Then, as illustrated in FIG. 1, each disc-like ceramic body 1 composed and fabricated in accordance with the invention has its opposite faces coated with silver paint to be processed into a varistor. The silver coatings were baked in a temperature range of 400–1000° C. into a pair of electrodes 2 and 3, thus completing the desired varistor. The varistor according to this invention derives its intended functions from the interior of the sintered body itself, so that the electrodes 2 and 3 could be made from other materials such as indium-gallium alloy, and by other methods such as evaporation or plating.

The ceramic body 1 of the varistor prepared as above comprises fine, conductive crystal grains 4 dispersed in a resistive oxide region 5, just like the ZnO varistor ceramic. The nonlinearity of its volt-ampere characteristic results as the first ingredient, $SrTiO_3$, is acted upon by the second, $CeO_2$, and third, $V_2O_5$, ingredients. Although the exact reason for this is not necessarily clear, a fairly reasonable theory would be that the second ingredient acts on the minute crystal particles 4 of the first ingredient to provide N-type semiconductors, whereas the oxide region 5, composed principally of the third ingredient, provides a P-type semiconductor.

Polyvinyl alcohol was used to bind the three pulverized ingredients in molding them into disc-like shape. This organic binder evaporates or is burnt out by the subsequent heat treatments of the moldings. Consequently the composition of the completed ceramic body 1 essentially corresponds to the starting substances only.

The characteristics of the varistors of this class might be evaluated from 60 and K in the volt-ampere characteristic formula of varistors in general, $I = (V/K)\alpha$, where I is the varistor current, V the applied voltage, K a constant, and $\alpha$ a coefficient indicative of the voltage-current nonlinearity. Exact measurement of K is difficult, however, so that the characteristics of the above prepared varistors were ascertained from the varistor voltage $E_{10}$ when a current of 10 mA was flowing, and from $\alpha = 1/\log (E_{10}/E_1)$, where $E_1$ is the varistor voltage corresponding to a current of 1 mA. The following TABLE 1 represents the various sets of proportions of the three noted ingredients used to produce the varistors in this EXAMPLE 1, together with their varistor voltage $E_{10}$, nonlinearity coefficient $\alpha$, and electrostatic capacity C. The electrostatic capacities of the varistors were measured at a frequency of 1 kHz.

TABLE 1

| Test No. | Composition in percent | | | Properties | | |
|---|---|---|---|---|---|---|
| | $SrTiO_3$ | $CeO_2$ | $V_2O_5$ | $E_{10}$, V | $\alpha$ | C, nF |
| 1 | 99.98 | 0.01 | 0.01 | 13 | 6 | 49 |
| 2 | 99.94 | 0.05 | 0.01 | 5 | 5 | 51 |
| 3 | 99.89 | 0.10 | 0.01 | 4 | 4 | 63 |
| 4 | 98.99 | 1.00 | 0.01 | 7 | 5 | 57 |
| 5 | 94.99 | 5.00 | 0.01 | 12 | 6 | 50 |
| 6 | 99.94 | 0.01 | 0.05 | 20 | 7 | 52 |
| 7 | 99.90 | 0.05 | 0.05 | 7 | 6 | 66 |
| 8 | 99.85 | 0.10 | 0.05 | 6 | 5 | 76 |
| 9 | 98.95 | 1.00 | 0.05 | 11 | 6 | 62 |
| 10 | 94.95 | 5.00 | 0.05 | 18 | 7 | 53 |
| 11 | 99.89 | 0.01 | 0.10 | 32 | 11 | 46 |
| 12 | 99.85 | 0.05 | 0.10 | 12 | 6 | 57 |
| 13 | 99.80 | 0.10 | 0.10 | 10 | 6 | 61 |
| 14 | 98.90 | 1.00 | 0.10 | 17 | 7 | 56 |
| 15 | 94.90 | 5.00 | 0.10 | 29 | 9 | 47 |
| 16 | 99.49 | 0.01 | 0.50 | 64 | 20 | 37 |
| 17 | 99.45 | 0.05 | 0.50 | 25 | 8 | 50 |
| 18 | 99.40 | 0.10 | 0.50 | 20 | 7 | 51 |
| 19 | 98.50 | 1.00 | 0.50 | 36 | 11 | 46 |
| 20 | 94.50 | 5.00 | 0.50 | 61 | 20 | 33 |
| 21 | 98.99 | 0.01 | 1.00 | 106 | 35 | 26 |
| 22 | 98.95 | 0.05 | 1.00 | 45 | 13 | 41 |
| 23 | 98.90 | 0.10 | 1.00 | 36 | 12 | 39 |
| 24 | 98.00 | 1.00 | 1.00 | 63 | 21 | 31 |
| 25 | 94.00 | 5.00 | 1.00 | 101 | 34 | 21 |

Figure 2:
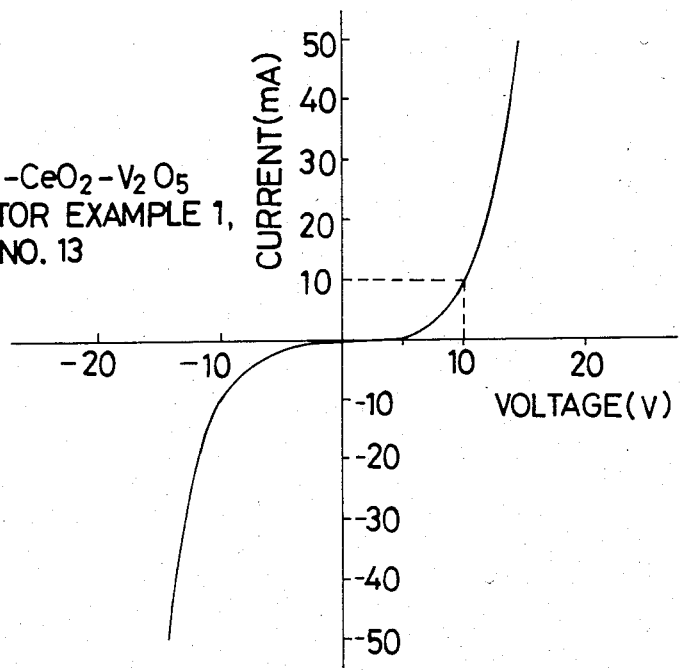
FIG. 2 is a graphic representation of the volt-ampere characteristic of an $SrTiO_3$-$CeO_2$-$V_2O_5$ varistor fabricated in EXAMPLE 1 of the invention.

FIG. 2 graphically represents by way of example the volt-ampere characteristic of the varistor of Test No. 13 given in TABLE 1.

Figure 3:
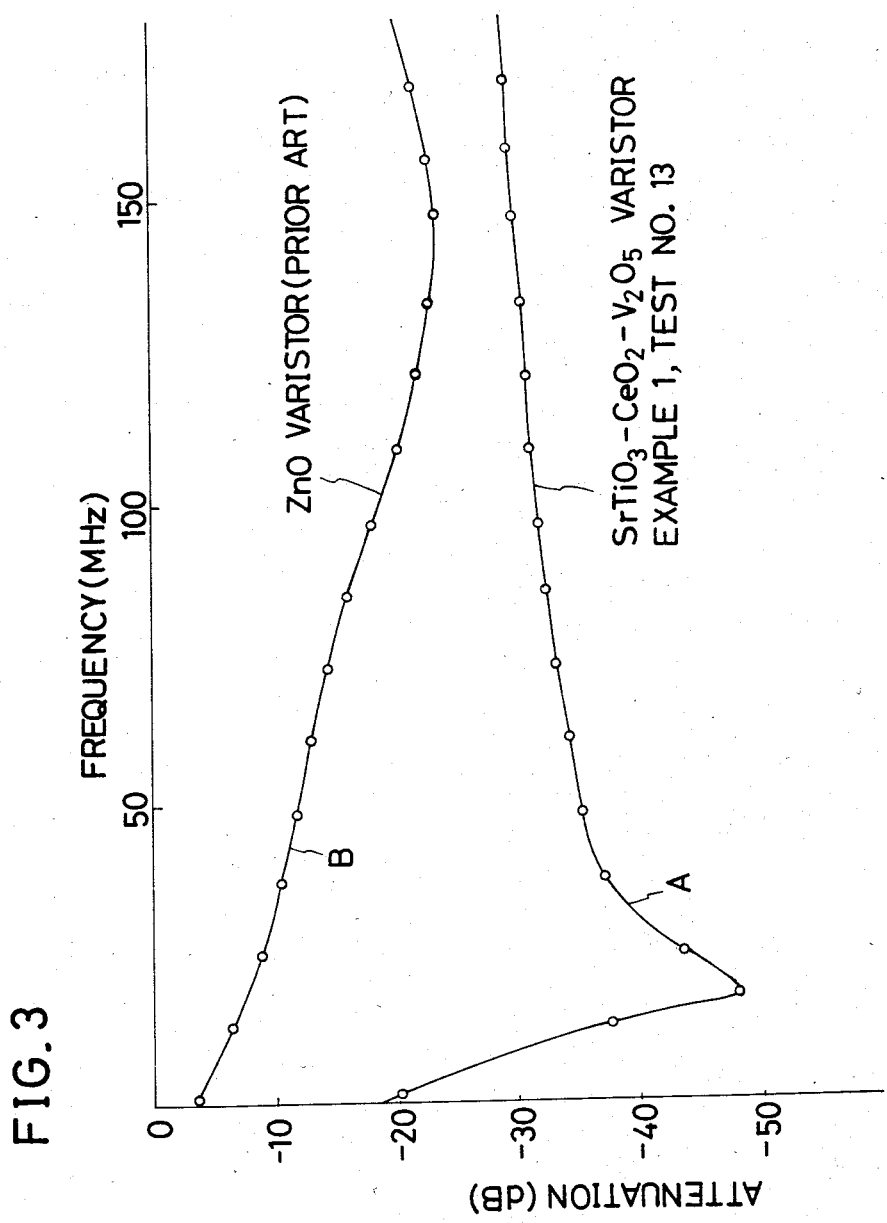
FIG. 3 is a graph representing the degrees of attenuation of various megahertz frequencies by the $SrTiO_3$-$CeO_2$-$V_2O_5$ varistor, in comparison with the attenuation characteristic of a known ZnO varistor, as tested in EXAMPLE 1 of the invention.

The varistor of Test No. 13 was also evaluated as to the attenuation of various megahertz frequencies, by connecting the varistor in parallel with a signal generator and with a spectrum analyzer. The curve A in the graph of FIG. 3 represents the results. The curve B in the same graph indicates, by way of comparison, the damping characteristic (measured by the smae method as above) of a varistor having its ceramic body composed principally of ZnO. A comparison of the curves A and B will reveal that the varistor according to this invention has a higher damping ability over a wide frequency range, thus exhibiting a capacitor-like property. The inventive material is therefore capable of absorbing voltage surges, noise, etc., by acting as both varistor and capacitor.

Although only the varistor of Test No. 13 was experimented as to its capacitor-like property, it is obvious that all the other varistors fabricated in this EXAMPLE 1 have a similar property, for their varistor voltages $E_{10}$ all fall between four and 106 V, their voltage-current nonlinearity coefficients $\alpha$ between four and 35, and their electrostatic capacities C between 21 and 76 nF.

In thus producing the $SrTiO_3$-$CeO_2$-$V_2O_5$ varistors proportioned as in TABLE 1, it has proved that if the proportion of the third ingredient, $V_2O_5$, is less than about 0.01%, the material introduces considerable fluctuations in the varistor voltage $E_{10}$ and nonlinearity coefficient $\alpha$ of the resulting products, making it difficult to provide varistors of desired properties. If the proportion of $V_2O_5$ exceeds about 1%, on the other hand, the resistive oxide region 5 of FIG. 5 has proved to occupy an unduly large space, with the $V_2O_5$ present at the surfaces causing fusion of the adjacent ceramic bodies to each other.

EXAMPLE 2

Ceramic bodies were fabricated from a combination of $SrTiO_3$ as the first ingredient, $WO_3$ as the second ingredient, and $CrO_3$ as the third ingredient, and were processed into varistors, through exactly the same procedure as in EXAMPLE 1. TABLE 2 indicates the various sets of proportions of the three ingredients used to produce the ceramic bodies, together with the varistor voltage $E_{10}$, voltage-current non-linearity coefficient $\alpha$, and electrostatic capacity C of the corresponding varistors. These properties of the varistors were also measured by the same method as in EXAMPLE 1.

TABLE 2

| Test No. | Composition in percent | | | Properties | | |
|---|---|---|---|---|---|---|
| | $SrTiO_3$ | $WO_3$ | $CrO_3$ | $E_{10}$, V | $\alpha$ | C, nF |
| 1 | 99.98 | 0.01 | 0.01 | 7 | 4 | 64 |
| 2 | 99.94 | 0.05 | 0.01 | 4 | 4 | 71 |
| 3 | 99.89 | 0.10 | 0.01 | 2 | 4 | 84 |
| 4 | 98.99 | 1.00 | 0.01 | 5 | 4 | 80 |
| 5 | 97.49 | 2.50 | 0.01 | 9 | 5 | 76 |
| 6 | 99.94 | 0.01 | 0.05 | 11 | 6 | 72 |
| 7 | 99.90 | 0.05 | 0.05 | 7 | 5 | 85 |
| 8 | 99.85 | 0.10 | 0.05 | 3 | 4 | 101 |
| 9 | 98.95 | 1.00 | 0.05 | 9 | 5 | 92 |
| 10 | 97.45 | 2.50 | 0.05 | 15 | 7 | 90 |
| 11 | 99.89 | 0.01 | 0.10 | 17 | 7 | 66 |
| 12 | 99.85 | 0.05 | 0.10 | 9 | 5 | 80 |
| 13 | 99.80 | 0.10 | 0.10 | 5 | 4 | 108 |
| 14 | 98.90 | 1.00 | 0.10 | 13 | 6 | 99 |
| 15 | 97.40 | 2.50 | 0.10 | 22 | 8 | 81 |
| 16 | 98.99 | 0.01 | 1.00 | 43 | 13 | 53 |
| 17 | 98.95 | 0.05 | 1.00 | 25 | 8 | 66 |
| 18 | 98.90 | 0.10 | 1.00 | 13 | 6 | 73 |
| 19 | 98.00 | 1.00 | 1.00 | 33 | 10 | 62 |
| 20 | 96.50 | 2.50 | 1.00 | 55 | 16 | 70 |
| 21 | 97.99 | 0.01 | 2.00 | 55 | 15 | 46 |
| 22 | 97.95 | 0.05 | 2.00 | 32 | 10 | 59 |
| 23 | 97.90 | 0.10 | 2.00 | 15 | 7 | 64 |
| 24 | 97.00 | 1.00 | 2.00 | 41 | 12 | 59 |
| 25 | 95.50 | 2.50 | 2.00 | 74 | 22 | 57 |

In the preparation of the ceramic bodies according to EXAMPLE 2 the oxidative heat treatment of the fired moldings converted the $CrO_3$ into $Cr_2O_3$. When the proportion of $CrO_3$ was made less than about 0.01% the $E_{10}$ and $\alpha$ of the resulting varistors fluctuated considerably. Also, when its proportion was made greater than about 2%, the relative space occupied by the resistive oxide region 5 became too large, and the $Cr_2O_3$ at the surfaces of the moldings caused their adhesion to each other.

EXAMPLE 3

$SrTiO_3$ was employed as the first ingredient, $Nb_2O_5$ as the second ingredient, and CuO as the third ingredient. Combined in various sets of proportions listed in TABLE 3, these ingredients were treated into ceramic bodies, and further into varistors, through exactly the same procedure as in EXAMPLE 1. TABLE 3 also shows the $E_{10}$, , and C of the varistors, as ascertained by the same method as in EXAMPLE 1.

TABLE 3

| Test No. | Composition in percent | | | Properties | | |
|---|---|---|---|---|---|---|
| | $SrTiO_3$ | $Nb_2O_5$ | CuO | $E_{10}$, V | $\alpha$ | C, nF |
| 1 | 99.98 | 0.01 | 0.01 | 10 | 5 | 80 |
| 2 | 99.94 | 0.05 | 0.01 | 5 | 5 | 81 |
| 3 | 99.89 | 0.10 | 0.01 | 3 | 4 | 96 |
| 4 | 98.99 | 1.00 | 0.01 | 6 | 5 | 62 |
| 5 | 97.49 | 2.50 | 0.01 | 13 | 6 | 76 |
| 6 | 99.94 | 0.01 | 0.05 | 11 | 6 | 99 |
| 7 | 99.90 | 0.05 | 0.05 | 6 | 5 | 109 |
| 8 | 99.85 | 0.10 | 0.05 | 3 | 4 | 116 |
| 9 | 98.95 | 1.00 | 0.05 | 7 | 5 | 102 |
| 10 | 97.45 | 2.50 | 0.05 | 14 | 6 | 89 |
| 11 | 99.89 | 0.01 | 0.10 | 12 | 6 | 79 |
| 12 | 99.85 | 0.05 | 0.10 | 6 | 5 | 93 |

TABLE 3-continued

| Test No. | Composition in percent | | | Properties | | |
|---|---|---|---|---|---|---|
| | $SrTiO_3$ | $Nb_2O_5$ | $CuO$ | $E_{10}$, V | $\alpha$ | C, nF |
| 13 | 99.80 | 0.10 | 0.10 | 4 | 4 | 107 |
| 14 | 98.90 | 1.00 | 0.10 | 8 | 5 | 93 |
| 15 | 97.40 | 2.50 | 0.10 | 16 | 7 | 80 |
| 16 | 98.99 | 0.01 | 1.00 | 36 | 18 | 66 |
| 17 | 98.95 | 0.05 | 1.00 | 18 | 8 | 72 |
| 18 | 98.90 | 0.10 | 1.00 | 11 | 6 | 90 |
| 19 | 98.00 | 1.00 | 1.00 | 22 | 9 | 81 |
| 20 | 96.50 | 2.50 | 1.00 | 47 | 21 | 77 |
| 21 | 94.99 | 0.01 | 5.00 | 73 | 30 | 52 |
| 22 | 94.95 | 0.05 | 5.00 | 36 | 17 | 61 |
| 23 | 94.90 | 0.10 | 5.00 | 23 | 9 | 73 |
| 24 | 94.00 | 1.00 | 5.00 | 45 | 20 | 62 |
| 25 | 92.50 | 2.50 | 5.00 | 95 | 37 | 61 |

Figure 4:
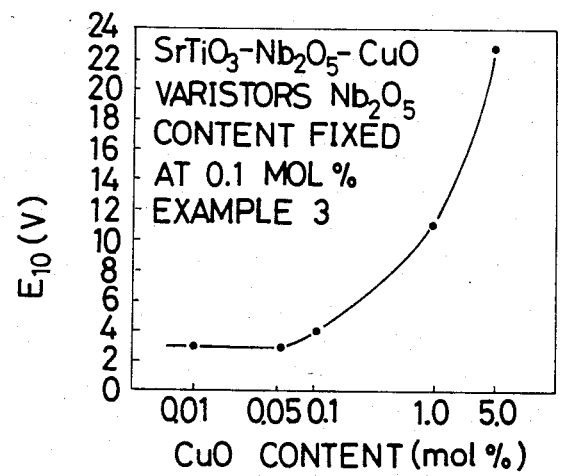
FIG. 4 is a graph plotting the curve of the varistor voltage $E_{10}$ of $SrTiO_3$-$Nb_2O_5$-CuO varistors against the varying percentages of their CuO content, with their $Nb_2O_5$ content fixed at 0.1%, as tested in EXAMPLE 3 of the invention.
Figure 5:
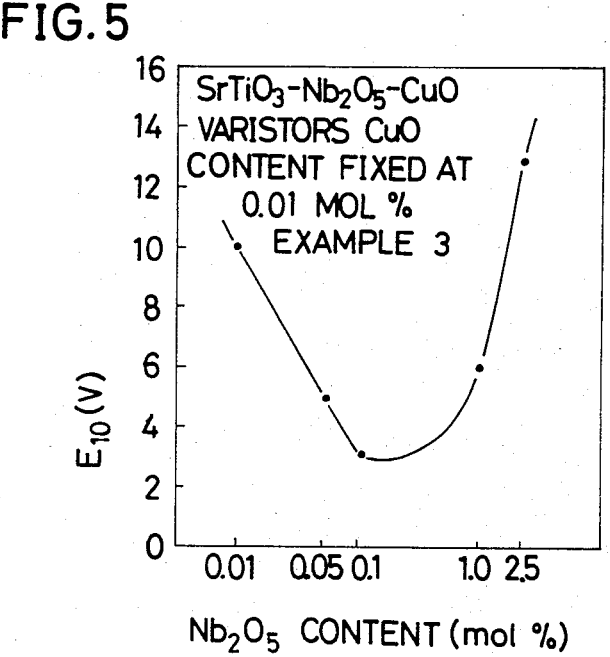
FIG. 5 is a graph plotting the curve of the varistor voltage $E_{10}$ of $SrTiO_3$-$Nb_2O_5$-CuO varistors against the varying percentages of their $Nb_2O_5$ content, with their CuO content fixed at 0.01%, also as tested in Example 3 of the invention.

An inspection of TABLE 3 will show that the percentage of $Nb_2O_5$ is fixed at 0.1 in some tests, while in others the percentage of CuO is fixed at 0.01. FIG. 4 graphically represents the curve of the $E_{10}$ of those varistors whose $Nb_2O_5$ content is fixed at 0.1%, plotted against the varying percentages of their CuO content. FIG. 5, on the other hand, plots the curve of the $E_{10}$ of those varistors whose CuO content is fixed at 0.01%, against the varying percentages of their $Nb_2O_5$ content.

A decrease of the CuO content to less than about 0.01% caused substantial fluctuations in the $E_{10}$ and $\alpha$ of the resulting varistors. The CuO content of over 5%, on the other hand, made too large the relative space occupied by the resistive oxide region 5 of each varistor, and caused mutual adhesion of the adjacent ceramic moldings through the CuO lying at their surfaces.

EXAMPLE 4

Disc-like ceramic bodies were fabricated from $SrTiO_3$ as the first ingredient, $Dy_2O_3$ as the second ingredient, and $Cu_2O$ as the third ingredient, in various sets of proportions, and were processed into varistors, through exactly the same procedure as in EXAMPLE 1. TABLE 4 represents the proportions of the three ingredients, as well as the $E_{10}$, $\alpha$, and C of the resulting varistors, as measured by the same method as in EXAMPLE 1.

TABLE 4

| Test No. | Composition in percent | | | Properties | | |
|---|---|---|---|---|---|---|
| | $SrTiO_3$ | $Dy_2O_3$ | $Cu_2O$ | $E_{10}$, V | $\alpha$ | C, nF |
| 1 | 99.98 | 0.01 | 0.01 | 7 | 4 | 57 |
| 2 | 99.94 | 0.05 | 0.01 | 4 | 4 | 63 |
| 3 | 99.89 | 0.10 | 0.01 | 2 | 4 | 73 |
| 4 | 98.99 | 1.00 | 0.01 | 5 | 4 | 70 |
| 5 | 97.49 | 2.50 | 0.01 | 9 | 5 | 51 |
| 6 | 99.94 | 0.01 | 0.05 | 11 | 6 | 68 |
| 7 | 99.90 | 0.05 | 0.05 | 7 | 5 | 74 |
| 8 | 99.85 | 0.10 | 0.05 | 3 | 4 | 89 |
| 9 | 98.95 | 1.00 | 0.05 | 9 | 5 | 69 |
| 10 | 97.45 | 2.50 | 0.05 | 15 | 7 | 58 |
| 11 | 99.89 | 0.01 | 0.10 | 17 | 7 | 51 |
| 12 | 99.85 | 0.05 | 0.10 | 9 | 5 | 67 |
| 13 | 99.80 | 0.10 | 0.10 | 5 | 4 | 71 |
| 14 | 98.90 | 1.00 | 0.10 | 13 | 6 | 63 |
| 15 | 97.40 | 2.50 | 0.10 | 22 | 8 | 53 |
| 16 | 98.99 | 0.01 | 1.00 | 43 | 13 | 47 |
| 17 | 98.95 | 0.05 | 1.00 | 25 | 8 | 59 |
| 18 | 98.90 | 0.10 | 1.00 | 13 | 6 | 63 |
| 19 | 98.00 | 1.00 | 1.00 | 33 | 10 | 54 |
| 20 | 96.50 | 2.50 | 1.00 | 55 | 16 | 47 |
| 21 | 97.99 | 0.01 | 2.00 | 55 | 15 | 36 |
| 22 | 97.95 | 0.05 | 2.00 | 32 | 10 | 48 |
| 23 | 97.90 | 0.10 | 2.00 | 15 | 7 | 51 |
| 24 | 97.00 | 1.00 | 2.00 | 41 | 12 | 42 |

TABLE 4-continued

| Test No. | Composition in percent | | | Properties | | |
|---|---|---|---|---|---|---|
| | $SrTiO_3$ | $Dy_2O_3$ | $Cu_2O$ | $E_{10}$, V | $\alpha$ | C, nF |
| 25 | 95.50 | 2.50 | 2.00 | 73 | 22 | 30 |

A decrease of the $Cu_2O$ content to less than about 0.01% in the above combination caused substantial fluctuations in the $E_{10}$ and $\alpha$ of the resulting varistors. When the $Cu_2O$ content was made greater than about 2.5%, on the other hand, the resistive oxide region 5 occupied too large a space, causing the thermal fusion to each other of the adjacent ceramic moldings through the $Cu_2O$ at their surfaces.

EXAMPLE 5

Ceramic discs were fabricated from $SrTiO_3$ as the first ingredient, $La_2O_3$ as the second ingredient, and $MoO_3$ as the third ingredient, in various sets of proportions, and were processed into varistors, through exactly the same procedure as in EXAMPLE 1. TABLE 5 lists the proportions of the three ingredients, together with the $E_{10}$, $\alpha$, and C of the varistors made therefrom, as measured by the same method as in EXAMPLE 1. Experiment has proved that the $MoO_3$ content of the ceramic materials in the above combination should be from about 0.01 to about 5.00%, for, falling outside this range, $MoO_3$ gave rise to the same difficulties as those pointed out in the foregoing EXAMPLES.

TABLE 5

| Test No. | Composition in percent | | | Properties | | |
|---|---|---|---|---|---|---|
| | $SrTiO_3$ | $La_2O_3$ | $MoO_3$ | $E_{10}$, V | $\alpha$ | C, nF |
| 1 | 99.98 | 0.01 | 0.01 | 8 | 4 | 54 |
| 2 | 99.94 | 0.05 | 0.01 | 4 | 3 | 61 |
| 3 | 99.89 | 0.10 | 0.01 | 3 | 3 | 76 |
| 4 | 98.99 | 1.00 | 0.01 | 5 | 4 | 69 |
| 5 | 97.49 | 2.50 | 0.01 | 7 | 4 | 50 |
| 6 | 99.94 | 0.01 | 0.05 | 22 | 7 | 63 |
| 7 | 99.90 | 0.05 | 0.05 | 11 | 5 | 73 |
| 8 | 99.85 | 0.10 | 0.05 | 9 | 5 | 81 |
| 9 | 98.95 | 1.00 | 0.05 | 14 | 6 | 70 |
| 10 | 97.45 | 2.50 | 0.05 | 20 | 7 | 56 |
| 11 | 99.89 | 0.01 | 0.10 | 53 | 15 | 49 |
| 12 | 99.85 | 0.05 | 0.10 | 28 | 9 | 67 |
| 13 | 99.80 | 0.10 | 0.10 | 19 | 7 | 70 |
| 14 | 98.90 | 1.00 | 0.10 | 36 | 11 | 58 |
| 15 | 97.40 | 2.50 | 0.10 | 47 | 13 | 48 |
| 16 | 98.99 | 0.01 | 1.00 | 53 | 15 | 43 |
| 17 | 98.95 | 0.05 | 1.00 | 28 | 9 | 51 |
| 18 | 98.90 | 0.10 | 1.00 | 19 | 7 | 61 |
| 19 | 98.00 | 1.00 | 1.00 | 36 | 11 | 54 |
| 20 | 96.50 | 2.50 | 1.00 | 47 | 13 | 41 |
| 21 | 94.99 | 0.01 | 5.00 | 89 | 30 | 30 |
| 22 | 94.95 | 0.05 | 5.00 | 46 | 13 | 42 |
| 23 | 94.90 | 0.10 | 5.00 | 34 | 10 | 48 |
| 24 | 94.00 | 1.00 | 5.00 | 57 | 17 | 40 |
| 25 | 92.50 | 2.50 | 5.00 | 79 | 25 | 27 |

EXAMPLE 6

Ceramic discs were fabricated from $SrTiO_3$ as the first ingredient, $Ta_2O_5$ as the second ingredient, and $MnO_2$ as the third ingredient, in various combinations of proportions, and were processed into varistors, through exactly the same procedure as in EXAMPLE 1. TABLE 6 gives the proportions of the above three ingredients, together with the $E_{10}$, , and C of the varistors made therefrom, as measured by the same method as in EXAMPLE 1. It has also been found that the $MnO_2$ content of the ceramic discs in the above combination, if outside the range of about 0.01–2.50%, gives rise to the difficulties mentioned previously.

TABLE 6

| Test No. | Composition in percent | | | Properties | | |
|---|---|---|---|---|---|---|
| | $SrTiO_3$ | $Ta_2O_5$ | $MnO_2$ | $E_{10}$, V | α | C, nF |
| 1 | 99.985 | 0.005 | 0.01 | 9 | 5 | 63 |
| 2 | 99.94 | 0.05 | 0.01 | 4 | 4 | 71 |
| 3 | 99.49 | 0.50 | 0.01 | 2 | 3 | 81 |
| 4 | 98.99 | 1.00 | 0.01 | 5 | 4 | 73 |
| 5 | 97.49 | 2.50 | 0.01 | 8 | 5 | 61 |
| 6 | 99.945 | 0.005 | 0.05 | 16 | 7 | 68 |
| 7 | 99.90 | 0.05 | 0.05 | 7 | 5 | 79 |
| 8 | 99.45 | 0.50 | 0.05 | 4 | 4 | 96 |
| 9 | 98.95 | 1.00 | 0.05 | 9 | 5 | 82 |
| 10 | 97.45 | 2.50 | 0.05 | 14 | 6 | 77 |
| 11 | 99.895 | 0.005 | 0.10 | 23 | 8 | 70 |
| 12 | 99.85 | 0.05 | 0.10 | 11 | 5 | 86 |
| 13 | 99.40 | 0.50 | 0.10 | 7 | 5 | 101 |
| 14 | 98.90 | 1.00 | 0.10 | 14 | 6 | 60 |
| 15 | 97.40 | 2.50 | 0.10 | 21 | 7 | 58 |
| 16 | 98.995 | 0.005 | 1.00 | 59 | 17 | 54 |
| 17 | 98.95 | 0.05 | 1.00 | 27 | 10 | 76 |
| 18 | 98.50 | 0.50 | 1.00 | 13 | 6 | 90 |
| 19 | 98.00 | 1.00 | 1.00 | 34 | 10 | 61 |
| 20 | 96.50 | 2.50 | 1.00 | 51 | 15 | 49 |
| 21 | 97.495 | 0.005 | 2.50 | 91 | 32 | 49 |
| 22 | 97.45 | 0.05 | 2.50 | 42 | 13 | 61 |
| 23 | 97.00 | 0.50 | 2.50 | 21 | 8 | 73 |
| 24 | 96.50 | 1.00 | 2.50 | 53 | 16 | 54 |
| 25 | 95.00 | 2.50 | 2.50 | 83 | 27 | 44 |

EXAMPLE 7

Ceramic discs were fabricated from $SrTiO_3$ as the first ingredient, $Sm_2O_3$ as the second ingredient, and CuO as the third ingredient, in various combinations of proportions, and were processed into varistors, through exactly the same procedure as in EXAMPLE 1. TABLE 7 lists the proportions of the above three ingredients, together with the $E_{10}$, α, and C of the varistors made therefrom, as measured by the same method as in EXAMPLE 1.

TABLE 7

| Test No. | Composition in percent | | | Properties | | |
|---|---|---|---|---|---|---|
| | $SrTiO_3$ | $Sm_2O_3$ | CuO | $E_{10}$, V | α | C, nF |
| 1 | 99.98 | 0.01 | 0.01 | 8 | 5 | 54 |
| 2 | 99.94 | 0.05 | 0.01 | 4 | 4 | 63 |
| 3 | 99.89 | 0.10 | 0.01 | 3 | 4 | 72 |
| 4 | 98.99 | 1.00 | 0.01 | 6 | 4 | 69 |
| 5 | 96.99 | 3.00 | 0.01 | 10 | 5 | 60 |
| 6 | 99.94 | 0.01 | 0.05 | 12 | 6 | 46 |
| 7 | 99.90 | 0.05 | 0.05 | 6 | 5 | 72 |
| 8 | 99.85 | 0.10 | 0.05 | 4 | 4 | 81 |
| 9 | 98.95 | 1.00 | 0.05 | 9 | 5 | 86 |
| 10 | 96.95 | 3.00 | 0.05 | 14 | 6 | 63 |
| 11 | 99.89 | 0.01 | 0.10 | 18 | 7 | 41 |
| 12 | 99.85 | 0.05 | 0.10 | 9 | 5 | 65 |
| 13 | 99.80 | 0.10 | 0.10 | 7 | 5 | 73 |
| 14 | 98.90 | 1.00 | 0.10 | 13 | 6 | 70 |
| 15 | 96.90 | 3.00 | 0.10 | 22 | 8 | 59 |
| 16 | 98.99 | 0.01 | 1.00 | 43 | 12 | 37 |
| 17 | 98.95 | 0.05 | 1.00 | 19 | 7 | 53 |
| 18 | 98.90 | 0.10 | 1.00 | 16 | 7 | 61 |
| 19 | 98.00 | 1.00 | 1.00 | 29 | 8 | 72 |
| 20 | 96.00 | 3.00 | 1.00 | 48 | 13 | 42 |
| 21 | 94.99 | 0.01 | 5.00 | 71 | 23 | 40 |
| 22 | 94.95 | 0.05 | 5.00 | 35 | 11 | 49 |
| 23 | 94.90 | 0.10 | 5.00 | 28 | 9 | 60 |
| 24 | 94.00 | 1.00 | 5.00 | 51 | 15 | 54 |
| 25 | 92.00 | 3.00 | 5.00 | 93 | 31 | 39 |

EXAMPLE 8

Ceramic discs were fabricated from $SrTiO_3$ as the first ingredient, $Pr_6O_{11}$ as the second ingredient, and $MnO_2$ as the third ingredient, in various combinations of proportions, and were processed into varistors, through exactly the same procedure as in EXAMPLE 1. TABLE 8 lists the proportions of the above three ingredients, together with the $E_{10}$, α, and C of the varistors made therefrom, as measured by the same method as in EXAMPLE 1.

TABLE 8

| Test No. | Composition in percent | | | Properties | | |
|---|---|---|---|---|---|---|
| | $SrTiO_3$ | $Pr_6O_{11}$ | $MnO_2$ | $E_{10}$, V | α | C, nF |
| 1 | 99.989 | 0.001 | 0.01 | 10 | 5 | 68 |
| 2 | 99.98 | 0.01 | 0.01 | 5 | 4 | 71 |
| 3 | 99.89 | 0.10 | 0.01 | 2 | 4 | 84 |
| 4 | 98.99 | 1.00 | 0.01 | 6 | 5 | 76 |
| 5 | 97.49 | 2.50 | 0.01 | 11 | 6 | 70 |
| 6 | 99.949 | 0.001 | 0.05 | 15 | 6 | 74 |
| 7 | 99.94 | 0.01 | 0.05 | 7 | 5 | 77 |
| 8 | 99.85 | 0.10 | 0.05 | 3 | 4 | 91 |
| 9 | 98.95 | 1.00 | 0.05 | 9 | 5 | 83 |
| 10 | 97.45 | 2.50 | 0.05 | 17 | 7 | 77 |
| 11 | 99.899 | 0.001 | 0.10 | 22 | 8 | 60 |
| 12 | 99.89 | 0.01 | 0.10 | 11 | 6 | 68 |
| 13 | 99.80 | 0.10 | 0.10 | 5 | 5 | 82 |
| 14 | 98.90 | 1.00 | 0.10 | 13 | 6 | 71 |
| 15 | 97.40 | 2.50 | 0.10 | 24 | 8 | 69 |
| 16 | 98.999 | 0.001 | 1.00 | 48 | 12 | 51 |
| 17 | 98.99 | 0.01 | 1.00 | 24 | 8 | 53 |
| 18 | 98.90 | 0.10 | 1.00 | 9 | 5 | 76 |
| 19 | 98.00 | 1.00 | 1.00 | 29 | 9 | 63 |
| 20 | 96.50 | 2.50 | 1.00 | 52 | 15 | 61 |
| 21 | 97.499 | 0.001 | 2.50 | 88 | 24 | 29 |
| 22 | 97.49 | 0.01 | 2.50 | 43 | 11 | 44 |
| 23 | 97.40 | 0.10 | 2.50 | 17 | 7 | 54 |
| 24 | 96.50 | 1.00 | 2.50 | 43 | 13 | 50 |
| 25 | 95.00 | 2.50 | 2.50 | 97 | 31 | 42 |

EXAMPLE 9

Ceramic discs were fabricated from $SrTiO_3$ as the first ingredient, $Nd_2O_3$ as the second ingredient, and $CrO_3$ as the third ingredient, in various combinations of proportions, and were processed into varistors, through exactly the same procedure as in EXAMPLE 1. TABLE 9 lists the proportions of the above three ingredients, together with the $E_{10}$, α, and C of the varistors made therefrom, as measured by the same method as in EXAMPLE 1. In the preparation of of the ceramic discs according to this EXAMPLE 9 the oxidative heat treatment of the fired moldings converted the $CrO_3$ into $Cr_2O_3$.

TABLE 9

| Test No. | Composition in percent | | | Properties | | |
|---|---|---|---|---|---|---|
| | $SrTiO_3$ | $Nd_2O_3$ | $CrO_3$ | $E_{10}$, V | α | C, nF |
| 1 | 99.98 | 0.01 | 0.01 | 7 | 5 | 66 |
| 2 | 99.94 | 0.05 | 0.01 | 3 | 4 | 69 |
| 3 | 99.89 | 0.10 | 0.01 | 2 | 4 | 77 |
| 4 | 98.99 | 1.00 | 0.01 | 5 | 5 | 71 |
| 5 | 95.99 | 4.00 | 0.01 | 11 | 6 | 63 |
| 6 | 99.94 | 0.01 | 0.05 | 10 | 6 | 69 |
| 7 | 99.90 | 0.05 | 0.05 | 4 | 4 | 78 |
| 8 | 99.85 | 0.10 | 0.05 | 4 | 4 | 88 |
| 9 | 98.95 | 1.00 | 0.05 | 7 | 5 | 76 |
| 10 | 95.95 | 4.00 | 0.05 | 17 | 7 | 69 |
| 11 | 99.89 | 0.01 | 0.10 | 15 | 7 | 65 |
| 12 | 99.85 | 0.05 | 0.10 | 7 | 5 | 71 |
| 13 | 99.80 | 0.10 | 0.10 | 5 | 4 | 76 |
| 14 | 98.90 | 1.00 | 0.10 | 12 | 6 | 70 |
| 15 | 95.90 | 4.00 | 0.10 | 23 | 8 | 61 |
| 16 | 98.99 | 0.01 | 1.00 | 34 | 10 | 60 |
| 17 | 98.95 | 0.05 | 1.00 | 15 | 6 | 62 |
| 18 | 98.90 | 0.10 | 1.00 | 10 | 5 | 61 |
| 19 | 98.00 | 1.00 | 1.00 | 25 | 8 | 60 |
| 20 | 95.00 | 4.00 | 1.00 | 54 | 15 | 59 |
| 21 | 97.99 | 0.01 | 2.00 | 60 | 18 | 51 |
| 22 | 97.95 | 0.05 | 2.00 | 25 | 8 | 51 |

TABLE 9-continued

| Test No. | Composition in percent | | | Properties | | |
|---|---|---|---|---|---|---|
| | SrTiO$_3$ | Nd$_2$O$_3$ | CrO$_3$ | E$_{10}$,V | α | C, nF |
| 23 | 97.90 | 0.10 | 2.00 | 17 | 7 | 52 |
| 24 | 97.00 | 1.00 | 2.00 | 43 | 12 | 51 |
| 25 | 94.00 | 4.00 | 2.00 | 94 | 30 | 50 |

EXAMPLE 10

Ceramic discs were fabricated from SrTiO$_3$ as the first ingredient, Y$_2$O$_3$ as the second ingredient, and MoO$_3$ as the third ingredient, in various combinations of proportions, and were processed into varistors, through exactly the same procedure as in EXAMPLE 1. TABLE 10 lists the proportions of the above three ingredients, together with the E$_{10}$, α, and C of the varistors made therefrom, as measured by the same method as in EXAMPLE 1.

TABLE 10

| Test No. | Composition in percent | | | Properties | | |
|---|---|---|---|---|---|---|
| | SrTiO$_3$ | Y$_2$O$_3$ | MoO$_3$ | E$_{10}$, V | α | C, nF |
| 1 | 99.98 | 0.01 | 0.01 | 8 | 5 | 42 |
| 2 | 99.94 | 0.05 | 0.01 | 3 | 4 | 50 |
| 3 | 99.89 | 0.10 | 0.01 | 2 | 4 | 61 |
| 4 | 98.99 | 1.00 | 0.01 | 5 | 4 | 52 |
| 5 | 95.99 | 4.00 | 0.01 | 12 | 6 | 46 |
| 6 | 99.94 | 0.01 | 0.05 | 12 | 6 | 46 |
| 7 | 99.90 | 0.05 | 0.05 | 4 | 4 | 63 |
| 8 | 99.85 | 0.10 | 0.05 | 3 | 4 | 74 |
| 9 | 98.95 | 1.00 | 0.05 | 7 | 5 | 66 |
| 10 | 95.95 | 4.00 | 0.05 | 18 | 7 | 52 |
| 11 | 99.89 | 0.01 | 0.10 | 18 | 7 | 41 |
| 12 | 99.85 | 0.05 | 0.10 | 7 | 5 | 51 |
| 13 | 99.80 | 0.10 | 0.10 | 5 | 4 | 63 |
| 14 | 98.90 | 1.00 | 0.10 | 11 | 6 | 57 |
| 15 | 95.90 | 4.00 | 0.10 | 25 | 8 | 41 |
| 16 | 98.99 | 0.01 | 1.00 | 38 | 11 | 33 |
| 17 | 98.95 | 0.05 | 1.00 | 15 | 7 | 49 |
| 18 | 98.90 | 0.10 | 1.00 | 9 | 6 | 61 |
| 19 | 98.00 | 1.00 | 1.00 | 24 | 8 | 41 |
| 20 | 95.00 | 4.00 | 1.00 | 57 | 16 | 36 |
| 21 | 94.99 | 0.01 | 5.00 | 70 | 21 | 19 |
| 22 | 94.95 | 0.05 | 5.00 | 27 | 8 | 32 |
| 23 | 94.90 | 0.10 | 5.00 | 17 | 7 | 43 |
| 24 | 94.00 | 1.00 | 5.00 | 43 | 13 | 33 |
| 25 | 91.00 | 4.00 | 5.00 | 99 | 29 | 21 |

EXAMPLE 11

This EXAMPLE is intended for the confirmation of the fact that the use of two different metal oxides as the second set of ingredients, in combination with the first and third ingredients chosen in accordance with the invention, makes the resulting ceramic materials as suitable for varistors as those containing but one second ingredient. The following combinations of two different metal oxides were tested as the second sets of ingredients, together with SrTiO$_3$ as the first ingredient and CuO as the third ingredient: Nb$_2$O$_5$ and Ta$_2$O$_5$, Nb$_2$O$_5$ and WO$_3$, Nb$_2$O$_5$ and La$_2$O$_3$, Nb$_2$O$_5$ and CeO$_2$, Nb$_2$O$_5$ and Dy$_2$O$_3$, La$_2$O$_5$ and Ta$_2$O$_5$, La$_2$O$_3$ and WO$_3$, La$_2$O$_3$ and CeO$_2$, La$_2$O$_3$ and Nd$_2$O$_3$, and La$_2$O$_3$ and Sm$_2$O$_3$.

Ceramic discs were fabricated from the combinations of the above enumerated components, in various sets of proportions, and were processed into varistors, through exactly the same procedure as in EXAMPLE 1. TABLES 11A through 11J represent the proportions of the respective combinations of components, as well as the E$_{10}$, α, and C of the varistors prepared therefrom, as measured by the same method as in EXAMPLE 1. It will be noted from these tables that the ceramic compositions of this EXAMPLE 11 are as suitable for varistors as those of EXAMPLES 1 through 10.

TABLE 11A

| Test No. | Composition in percent | | | | Properties | | |
|---|---|---|---|---|---|---|---|
| | SrTiO$_3$ | Nb$_2$O$_5$ | Ta$_2$O$_5$ | CuO | E$_{10}$, V | α | C, nF |
| 1 | 99.4 | 0.02 | 0.08 | 0.5 | 12 | 5 | 71 |
| 2 | 99.4 | 0.05 | 0.05 | 0.5 | 13 | 6 | 68 |
| 3 | 99.4 | 0.08 | 0.02 | 0.5 | 13 | 6 | 67 |

TABLE 11B

| Test No. | Composition in percent | | | | Properties | | |
|---|---|---|---|---|---|---|---|
| | SrTiO$_3$ | Nb$_2$O$_5$ | WO$_3$ | CuO | E$_{10}$, V | α | C, nF |
| 4 | 99.4 | 0.02 | 0.08 | 0.5 | 14 | 6 | 66 |
| 5 | 99.4 | 0.05 | 0.05 | 0.5 | 13 | 6 | 65 |
| 6 | 99.4 | 0.08 | 0.02 | 0.5 | 14 | 6 | 67 |

TABLE 11C

| Test No. | Composition in percent | | | | Properties | | |
|---|---|---|---|---|---|---|---|
| | SrTiO$_3$ | Nb$_2$O$_5$ | La$_2$O$_3$ | CuO | E$_{10}$, V | α | C, nF |
| 7 | 99.4 | 0.02 | 0.08 | 0.5 | 9 | 5 | 79 |
| 8 | 99.4 | 0.05 | 0.05 | 0.5 | 8 | 5 | 83 |
| 9 | 99.4 | 0.08 | 0.02 | 0.5 | 8 | 5 | 86 |

TABLE 11D

| Test No. | Composition in percent | | | | Properties | | |
|---|---|---|---|---|---|---|---|
| | SrTiO$_3$ | Nb$_2$O$_5$ | CeO$_2$ | CuO | E$_{10}$, V | α | C, nF |
| 10 | 99.4 | 0.02 | 0.08 | 0.5 | 7 | 5 | 89 |
| 11 | 99.4 | 0.05 | 0.05 | 0.5 | 8 | 5 | 91 |
| 12 | 99.4 | 0.08 | 0.02 | 0.5 | 7 | 5 | 90 |

TABLE 11E

| Test No. | Composition in percent | | | | Properties | | |
|---|---|---|---|---|---|---|---|
| | SrTiO$_3$ | Nb$_2$O$_5$ | Dy$_2$O$_3$ | CuO | E$_{10}$, V | α | C, nF |
| 13 | 99.4 | 0.02 | 0.08 | 0.5 | 7 | 5 | 87 |
| 14 | 99.4 | 0.05 | 0.05 | 0.5 | 7 | 5 | 89 |
| 15 | 99.4 | 0.08 | 0.02 | 0.5 | 6 | 4 | 93 |

TABLE 11F

| Test No. | Composition in percent | | | | Properties | | |
|---|---|---|---|---|---|---|---|
| | SrTiO$_3$ | La$_2$O$_3$ | Ta$_2$O$_5$ | CuO | E$_{10}$, V | α | C, nF |
| 16 | 99.4 | 0.02 | 0.08 | 0.5 | 10 | 5 | 76 |
| 17 | 99.4 | 0.05 | 0.05 | 0.5 | 11 | 5 | 73 |
| 18 | 99.4 | 0.08 | 0.02 | 0.5 | 10 | 5 | 77 |

TABLE 11G

| Test No. | Composition in percent | | | | Properties | | |
|---|---|---|---|---|---|---|---|
| | SrTiO$_3$ | La$_2$O$_3$ | WO$_3$ | CuO | E$_{10}$, V | α | C, nF |
| 19 | 99.4 | 0.02 | 0.08 | 0.5 | 11 | 5 | 70 |
| 20 | 99.4 | 0.05 | 0.05 | 0.5 | 12 | 5 | 65 |
| 21 | 99.4 | 0.08 | 0.02 | 0.5 | 10 | 5 | 74 |

TABLE 11H

| Test No. | Composition in percent | | | | Properties | | |
|---|---|---|---|---|---|---|---|
| | SrTiO$_3$ | La$_2$O$_3$ | CeO$_2$ | CuO | E$_{10}$, V | α | C, nF |
| 22 | 99.4 | 0.02 | 0.08 | 0.5 | 7 | 4 | 84 |
| 23 | 99.4 | 0.05 | 0.05 | 0.5 | 7 | 5 | 83 |
| 24 | 99.4 | 0.08 | 0.02 | 0.5 | 8 | 5 | 79 |

TABLE 11I

| Test No. | Composition in percent | | | | Properties | | |
|---|---|---|---|---|---|---|---|
| | $SrTiO_3$ | $La_2O_3$ | $Nd_2O_3$ | CuO | $E_{10}$, V | $\alpha$ | C, nF |
| 25 | 99.4 | 0.02 | 0.08 | 0.5 | 6 | 4 | 92 |
| 26 | 99.4 | 0.05 | 0.05 | 0.5 | 7 | 4 | 86 |
| 27 | 99.4 | 0.08 | 0.02 | 0.5 | 7 | 4 | 83 |

TABLE 11J

| Test No. | Composition in percent | | | | Properties | | |
|---|---|---|---|---|---|---|---|
| | $SrTiO_3$ | $La_2O_3$ | $Sm_2O_3$ | CuO | $E_{10}$, V | $\alpha$ | C, nF |
| 28 | 99.4 | 0.02 | 0.08 | 0.5 | 8 | 5 | 83 |
| 29 | 99.4 | 0.05 | 0.05 | 0.5 | 7 | 4 | 90 |
| 30 | 99.4 | 0.08 | 0.02 | 0.5 | 7 | 5 | 87 |

EXAMPLE 12

This EXAMPLE is intended to prove that ceramic materials suitable for varistors can be fabricated with the use of two different metal oxides as the third set of ingredients, in combination with the first and second ingredients chosen in accordance with the invention. The following combinations of two different metal oxides were tested as the second sets of ingredients, together with $SrTiO_3$ as the first ingredient and $Nb_2O_5$, $WO_3$ or $La_2O_3$ as the second ingredient: CuO and $Cu_2O$, CuO and $MoO_3$, $MoO_3$ and $V_2O_5$, $V_2O_5$ and $CrO_3$, and $CrO_3$ and $Cu_2O$.

Ceramic bodies were fabricated from the various combinations of four of the listed ingredients, in various sets of proportions, and were processed into varistors, through exactly the same procedure as in EXAMPLE 1. TABLES 12A through 12-O represent the proportions of such combinations of ingredients, as well as the $E_{10}$, $\alpha$, and C of the varistors prepared therefrom, as measured by the same method as in EXAMPLE 1. The tabulated results indicate that the ceramic compositions of this EXAMPLE 12 are as suitable for varistors as those of EXAMPLES 1 through 10.

TABLE 12A

| Test No. | Composition in percent | | | | Properties | | |
|---|---|---|---|---|---|---|---|
| | $SrTiO_3$ | $Nb_2O_5$ | CuO | $Cu_2O$ | $E_{10}$, V | $\alpha$ | C, nF |
| 1 | 99.4 | 0.1 | 0.1 | 0.4 | 11 | 5 | 69 |
| 2 | 99.4 | 0.1 | 0.25 | 0.25 | 10 | 5 | 72 |
| 3 | 99.4 | 0.1 | 0.4 | 0.1 | 11 | 5 | 68 |

TABLE 12B

| Test No. | Composition in percent | | | | Properties | | |
|---|---|---|---|---|---|---|---|
| | $SrTiO_3$ | $Nb_2O_5$ | CuO | $MoO_3$ | $E_{10}$, V | $\alpha$ | C, nF |
| 4 | 99.4 | 0.1 | 0.1 | 0.4 | 12 | 5 | 68 |
| 5 | 99.4 | 0.1 | 0.25 | 0.25 | 11 | 5 | 70 |
| 6 | 99.4 | 0.1 | 0.4 | 0.1 | 10 | 5 | 73 |

TABLE 12C

| Test No. | Composition in percent | | | | Properties | | |
|---|---|---|---|---|---|---|---|
| | $SrTiO_3$ | $Nb_2O_5$ | $MoO_3$ | $V_2O_5$ | $E_{10}$, V | $\alpha$ | C, nF |
| 7 | 99.4 | 0.1 | 0.1 | 0.4 | 13 | 5 | 62 |
| 8 | 99.4 | 0.1 | 0.25 | 0.25 | 15 | 6 | 59 |
| 9 | 99.4 | 0.1 | 0.4 | 0.1 | 15 | 6 | 59 |

TABLE 12D

| Test No. | Composition in percent | | | | Properties | | |
|---|---|---|---|---|---|---|---|
| | $SrTiO_3$ | $Nb_2O_5$ | $V_2O_5$ | $CrO_3$ | $E_{10}$, V | $\alpha$ | C, nF |
| 10 | 99.4 | 0.1 | 0.1 | 0.4 | 15 | 6 | 60 |
| 11 | 99.4 | 0.1 | 0.25 | 0.25 | 14 | 5 | 62 |
| 12 | 99.4 | 0.1 | 0.4 | 0.1 | 13 | 5 | 67 |

TABLE 12E

| Test No. | Composition in percent | | | | Properties | | |
|---|---|---|---|---|---|---|---|
| | $SrTiO_3$ | $Nb_2O_5$ | $CrO_3$ | $Cu_2O$ | $E_{10}$, V | $\alpha$ | C, nF |
| 13 | 99.4 | 0.1 | 0.1 | 0.4 | 10 | 5 | 72 |
| 14 | 99.4 | 0.1 | 0.25 | 0.25 | 9 | 5 | 76 |
| 15 | 99.4 | 0.1 | 0.4 | 0.1 | 12 | 5 | 67 |

TABLE 12F

| Test No. | Composition in percent | | | | Properties | | |
|---|---|---|---|---|---|---|---|
| | $SrTiO_3$ | $WO_3$ | CuO | $Cu_2O$ | $E_{10}$, V | $\alpha$ | C, nF |
| 16 | 99.4 | 0.1 | 0.1 | 0.4 | 12 | 5 | 65 |
| 17 | 99.4 | 0.1 | 0.25 | 0.25 | 13 | 6 | 62 |
| 18 | 99.4 | 0.1 | 0.4 | 0.1 | 13 | 5 | 63 |

TABLE 12G

| Test No. | Composition in percent | | | | Properties | | |
|---|---|---|---|---|---|---|---|
| | $SrTiO_3$ | $WO_3$ | CuO | $MoO_3$ | $E_{10}$, V | $\alpha$ | C, nF |
| 19 | 99.4 | 0.1 | 0.1 | 0.4 | 13 | 5 | 62 |
| 20 | 99.4 | 0.1 | 0.25 | 0.25 | 15 | 5 | 59 |
| 21 | 99.4 | 0.1 | 0.4 | 0.1 | 15 | 6 | 57 |

TABLE 12H

| Test No. | Composition in percent | | | | Properties | | |
|---|---|---|---|---|---|---|---|
| | $SrTiO_3$ | $WO_3$ | $MoO_3$ | $V_2O_5$ | $E_{10}$, V | $\alpha$ | C, nF |
| 22 | 99.4 | 0.1 | 0.1 | 0.4 | 14 | 5 | 60 |
| 23 | 99.4 | 0.1 | 0.25 | 0.25 | 16 | 6 | 55 |
| 24 | 99.4 | 0.1 | 0.4 | 0.1 | 15 | 6 | 59 |

TABLE 12I

| Test No. | Composition in percent | | | | Properties | | |
|---|---|---|---|---|---|---|---|
| | $SrTiO_3$ | $WO_3$ | $V_2O_5$ | $CrO_3$ | $E_{10}$, V | $\alpha$ | C, nF |
| 25 | 99.4 | 0.1 | 0.1 | 0.4 | 16 | 6 | 55 |
| 26 | 99.4 | 0.1 | 0.25 | 0.25 | 16 | 6 | 54 |
| 27 | 99.4 | 0.1 | 0.4 | 0.1 | 13 | 5 | 62 |

TABLE 12J

| Test No. | Composition in percent | | | | Properties | | |
|---|---|---|---|---|---|---|---|
| | $SrTiO_3$ | $WO_3$ | $CrO_3$ | $Cu_2O$ | $E_{10}$, V | $\alpha$ | C, nF |
| 28 | 99.4 | 0.1 | 0.1 | 0.4 | 10 | 5 | 71 |
| 29 | 99.4 | 0.1 | 0.25 | 0.25 | 12 | 5 | 66 |
| 30 | 99.4 | 0.1 | 0.4 | 0.1 | 12 | 5 | 65 |

TABLE 12K

| Test No. | Composition in percent | | | | Properties | | |
|---|---|---|---|---|---|---|---|
| | $SrTiO_3$ | $La_2O_3$ | CuO | $Cu_2O$ | $E_{10}$, V | $\alpha$ | C, nF |
| 31 | 99.4 | 0.1 | 0.1 | 0.4 | 8 | 5 | 77 |
| 32 | 99.4 | 0.1 | 0.25 | 0.25 | 7 | 5 | 81 |
| 33 | 99.4 | 0.1 | 0.4 | 0.1 | 7 | 5 | 82 |

TABLE 12L

| Test No. | Composition in percent | | | | Properties | | |
|---|---|---|---|---|---|---|---|
| | $SrTiO_3$ | $La_2O_3$ | CuO | $MoO_3$ | $E_{10}$, V | $\alpha$ | C, nF |
| 34 | 99.4 | 0.1 | 0.1 | 0.4 | 7 | 5 | 82 |
| 35 | 99.4 | 0.1 | 0.25 | 0.25 | 7 | 5 | 83 |

TABLE 12L-continued

| Test No. | Composition in percent | | | | Properties | | |
|---|---|---|---|---|---|---|---|
| | SrTiO$_3$ | La$_2$O$_3$ | CuO | MoO$_3$ | E$_{10}$, V | $\alpha$ | C, nF |
| 36 | 99.4 | 0.1 | 0.4 | 0.1 | 8 | 5 | 80 |

TABLE 12M

| Test No. | Composition in percent | | | | Properties | | |
|---|---|---|---|---|---|---|---|
| | SrTiO$_3$ | La$_2$O$_3$ | MoO$_3$ | V$_2$O$_5$ | E$_{10}$, V | $\alpha$ | C, nF |
| 37 | 99.4 | 0.1 | 0.1 | 0.4 | 9 | 5 | 76 |
| 38 | 99.4 | 0.1 | 0.25 | 0.25 | 9 | 5 | 72 |
| 39 | 99.4 | 0.1 | 0.4 | 0.1 | 10 | 5 | 69 |

TABLE 12N

| Test No. | Composition in percent | | | | Properties | | |
|---|---|---|---|---|---|---|---|
| | SrTiO$_3$ | La$_2$O$_3$ | V$_2$O$_5$ | CrO$_3$ | E$_{10}$, V | $\alpha$ | C, nF |
| 40 | 99.4 | 0.1 | 0.1 | 0.4 | 10 | 5 | 68 |
| 41 | 99.4 | 0.1 | 0.25 | 0.25 | 9 | 5 | 72 |
| 42 | 99.4 | 0.1 | 0.4 | 0.1 | 8 | 5 | 81 |

TABLE 12-O

| Test No. | Composition in percent | | | | Properties | | |
|---|---|---|---|---|---|---|---|
| | SrTiO$_3$ | La$_2$O$_3$ | CrO$_3$ | Cu$_2$O | E$_{10}$, V | $\alpha$ | C, nF |
| 43 | 99.4 | 0.1 | 0.1 | 0.4 | 7 | 4 | 82 |
| 44 | 99.4 | 0.1 | 0.25 | 0.25 | 6 | 4 | 85 |
| 45 | 99.4 | 0.1 | 0.4 | 0.1 | 7 | 5 | 83 |

EXAMPLE 13

In order to ascertain the relationship between the temperatures of the oxidative heat treatment during the fabrication of ceramic materials and the properties of the varistors made therefrom, the temperature of the oxidative heat treatment was set in this EXAMPLE at various values from 700° to 1170° C. Ceramic bodies were fabricated from the combinations of SrTiO$_3$, Nb$_2$O$_5$ and CuO, of SrTiO$_3$, Dy$_2$O$_3$ and Cu$_2$O, of SrTiO$_3$, CeO$_2$ and V$_2$O$_5$, of SrTiO$_3$, WO$_3$ and CrO$_3$, of SrTiO$_3$, Y$_2$O$_3$ and MoO$_3$, and of SrTiO$_3$, Ta$_2$O$_5$ and MnO$_2$, in various sets of proportions, and were processed into varistors in a manner identical in other respects with that of EXAMPLE 1. TABLES 13A through 13F give the proportions of such combinations of ingredients, as well as the temperatures of the oxidative heat treatment, the resistivities of the ceramic bodies, and of the varistors made therefrom. The resistivity was measured by the four-probe method at a temperature of 25° C.

TABLE 13A

| Test No. | Composition in percent | | | Temperature of oxidative heat treatment, °C. | Properties | |
|---|---|---|---|---|---|---|
| | SrTiO$_3$ | Nb$_2$O$_5$ | CuO | | Resistivity, ohm-cm | $\alpha$ |
| 1 | 99.0 | 0.5 | 0.5 | 700 | 5 × 10$^{-1}$ | 1 |
| 2 | 99.0 | 0.5 | 0.5 | 800 | 3 × 10 | 2 |
| 3 | 99.0 | 0.5 | 0.5 | 900 | 1 × 10$^3$ | 4 |
| 4 | 99.0 | 0.5 | 0.5 | 1000 | 5 × 10$^3$ | 13 |
| 5 | 99.0 | 0.5 | 0.5 | 1100 | 8 × 10$^3$ | 26 |
| 6 | 99.0 | 0.5 | 0.5 | 1170 | 2 × 10$^4$ | 61 |

TABLE 13B

| Test No. | Composition in percent | | | Temperature of oxidative heat treatment, °C. | Properties | |
|---|---|---|---|---|---|---|
| | SrTiO$_3$ | Dy$_2$O$_3$ | Cu$_2$O | | Resistivity, ohm-cm | $\alpha$ |
| 7 | 99.0 | 0.5 | 0.5 | 700 | 6 × 10$^{-1}$ | 1 |
| 8 | 99.0 | 0.5 | 0.5 | 800 | 4 × 10 | 2 |
| 9 | 99.0 | 0.5 | 0.5 | 900 | 1 × 10$^3$ | 4 |
| 10 | 99.0 | 0.5 | 0.5 | 1000 | 5 × 10$^3$ | 12 |
| 11 | 99.0 | 0.5 | 0.5 | 1100 | 9 × 10$^3$ | 29 |
| 12 | 99.0 | 0.5 | 0.5 | 1170 | 3 × 10$^4$ | 69 |

TABLE 13C

| Test No. | Composition in percent | | | Temperature of oxidative heat treatment, °C. | Properties | |
|---|---|---|---|---|---|---|
| | SrTiO$_3$ | CeO$_2$ | V$_2$O$_5$ | | Resistivity, ohm-cm | $\alpha$ |
| 13 | 99.0 | 0.5 | 0.5 | 700 | 8 × 10$^{-1}$ | 1 |
| 14 | 99.0 | 0.5 | 0.5 | 800 | 6 × 10 | 2 |
| 15 | 99.0 | 0.5 | 0.5 | 900 | 2 × 10$^3$ | 4 |
| 16 | 99.0 | 0.5 | 0.5 | 1000 | 7 × 10$^3$ | 15 |
| 17 | 99.0 | 0.5 | 0.5 | 1100 | 10 × 10$^3$ | 31 |
| 18 | 99.0 | 0.5 | 0.5 | 1170 | 5 × 10$^4$ | 84 |

TABLE 13D

| Test No. | Composition in percent | | | Temperature of oxidative heat treatment, °C. | Properties | |
|---|---|---|---|---|---|---|
| | SrTiO$_3$ | WO$_3$ | CrO$_3$ | | Resistivity, ohm-cm | $\alpha$ |
| 19 | 99.0 | 0.5 | 0.5 | 700 | 6 × 10$^{-1}$ | 1 |
| 20 | 99.0 | 0.5 | 0.5 | 800 | 6 × 10 | 2 |
| 21 | 99.0 | 0.5 | 0.5 | 900 | 1 × 10$^3$ | 4 |
| 22 | 99.0 | 0.5 | 0.5 | 1000 | 6 × 10$^3$ | 13 |
| 23 | 99.0 | 0.5 | 0.5 | 1100 | 8 × 10$^3$ | 30 |
| 24 | 99.0 | 0.5 | 0.5 | 1170 | 3 × 10$^4$ | 70 |

TABLE 13E

| Test No. | Composition in percent | | | Temperature of oxidative heat treatment, °C. | Properties | |
|---|---|---|---|---|---|---|
| | SrTiO$_3$ | Y$_2$O$_3$ | MoO$_3$ | | Resistivity, ohm-cm | $\alpha$ |
| 25 | 99.0 | 0.5 | 0.5 | 700 | 7 × 10$^{-1}$ | 1 |
| 26 | 99.0 | 0.5 | 0.5 | 800 | 7 × 10 | 2 |
| 27 | 99.0 | 0.5 | 0.5 | 900 | 2 × 10$^3$ | 4 |
| 28 | 99.0 | 0.5 | 0.5 | 1000 | 7 × 10$^3$ | 16 |
| 29 | 99.0 | 0.5 | 0.5 | 1100 | 11 × 10$^3$ | 33 |
| 30 | 99.0 | 0.5 | 0.5 | 1170 | 5 × 10$^4$ | 86 |

TABLE 13F

| Test No. | Composition in percent | | | Temperature of oxidative heat treatment, °C. | Properties | |
|---|---|---|---|---|---|---|
| | SrTiO$_3$ | Ta$_2$O$_5$ | MnO$_2$ | | Resistivity, ohm-cm | $\alpha$ |
| 31 | 99.0 | 0.5 | 0.5 | 700 | 6 × 10$^{-1}$ | 1 |
| 32 | 99.0 | 0.5 | 0.5 | 800 | 4 × 10 | 2 |
| 33 | 99.0 | 0.5 | 0.5 | 900 | 1 × 10$^3$ | 4 |
| 34 | 99.0 | 0.5 | 0.5 | 1000 | 6 × 10$^3$ | 12 |
| 35 | 99.0 | 0.5 | 0.5 | 1100 | 9 × 10$^3$ | 31 |
| 36 | 99.0 | 0.5 | 0.5 | 1170 | 3 × 10$^4$ | 63 |

Figure 6:
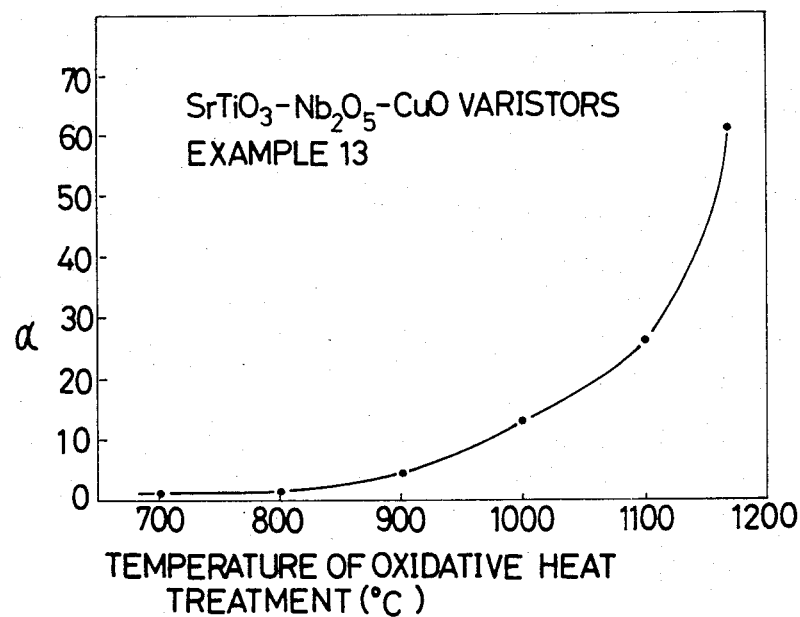
FIG. 6 is a graph plotting the curve of the volt-ampere nonlinearity coefficient $\alpha$ of $SrTiO_3$-$Nb_2O_5$-CuO varistors against the temperatures at which they were subjected to oxidative heat treatment in manufacture, as tested in EXAMPLE 13 of the invention.

On the basis of the data given in TABLE 13A, FIG. 6 plots the curve of the $\alpha$ of the SrTiO$_3$-Nb$_2$O$_5$-CuO varistors against the temperature of the oxidative heat treatment. This graph makes clear that the $\alpha$ of the varistors can be controlled by the temperature of the oxidative heat treatment during the fabrication of the ceramic bodies. It will also be seen from TABLES 13A through 13F that the resistivity of the ceramic bodies varies with the temperature of the oxidative heat treatment. For the provision of varistors of the desired characteristics, therefore, the oxidative heat treatment should be conducted in a temperature range of about 800°–1170° C. Should the temperature be less than about 800° C., the α of the ceramic bodies would become too small for varistors. If the temperature were made higher than about 1300° C., on the other hand, then the resistivity of the ceramic bodies would become too high for varistors.

EXAMPLE 14

Ceramic discs were fabricated from various combinations of three possible ingredients set forth in TABLE 14, in like proportions, and were processed into varistors, through a procedure similar to that of EXAMPLE 1. In order to evaluate the pulse-withstanding abilities of these varistors, 10 voltage pulses of 100 V were successively applied to each varistor, and a rate of change in $E_{10}$ before and after the pulse application was calculated. TABLE 14 summarizes the results.

TABLE 14

| Test No. | Composition | | | Rate of change in $E_{10}$, % |
|---|---|---|---|---|
| | First ingredient 99.4% | Second ingredient 0.1% | Third ingredient 0.5% | |
| 1 | SrTiO$_3$ | Nb$_2$O$_5$ | CuO | 0.03 |
| 2 | SrTiO$_3$ | WO$_3$ | CrO$_3$ | 0.02 |
| 3 | SrTiO$_3$ | Ta$_2$O$_5$ | MnO$_2$ | 0.03 |
| 4 | SrTiO$_3$ | Y$_2$O$_3$ | MoO$_3$ | 0.06 |
| 5 | SrTiO$_3$ | Sm$_2$O$_3$ | CuO | 0.04 |
| 6 | SrTiO$_3$ | CeO$_2$ | V$_2$O$_5$ | 0.04 |
| 7 | SrTiO$_3$ | Pr$_6$O$_{11}$ | MnO$_2$ | 0.06 |
| 8 | SrTiO$_3$ | Nd$_2$O$_3$ | CrO$_3$ | 0.05 |
| 9 | SrTiO$_3$ | Dy$_2$O$_3$ | Cu$_2$O | 0.05 |
| 10 | SrTiO$_3$ | La$_2$O$_3$ | MoO$_3$ | 0.06 |

It will be observed from TABLE 14 that the $E_{10}$ of the various varistors in accordance with the invention varies only from 0.02 to 0.06% before and after the application of ten 100-volt pulses in succession. The rate of change in $E_{10}$ of the conventional ZnO varistors, measured by a like method by way of comparison, was in the range of 15–20%. The little change in $E_{10}$ of the varistors in accordance with the invention evidences that they hardly suffer from voltage surges in use.

The above presented EXAMPLES 1 through 14 prove that the second ingredient should be used in a proportion of about 0.001–5.000% in any combination with first and second ingredients in the manufacture of ceramic materials in accordance with the invention. Intended as an additive for making the materials semiconductive, the second ingredient when used in that range makes the size of the crystal grains from about 20 to 40 micrometers in diameter and does not make the $E_{10}$ too high. Should the content of the second ingredient fall outside the specified range, the grain size would become too large, and the $E_{10}$ too high, to provide favorable semiconductor materials and favorable varistors. The proportion of the second ingredient should be in a range of 0.05–1.00% to obtain appropriate values of $E_{10}$.

Intended as an additive for improving the nonlinear volt-ampere characteristic of the ceramic materials, the third ingredient should be used in an amount ranging from about 0.01 to about 5.00%. If the content of the third ingredient were less than about 0.01%, the $E_{10}$, α, etc., of ceramic bodies would fluctuate considerably, making it difficult to provide varistors of desired performance characteristics. If it were greater than about 5.00%, on the other hand, then the resistive oxide region 5, FIG. 1, of each ceramic body would occupy too large a space in relation to the crystal grains 4, and the third ingredient at the surfaces of the ceramic bodies would cause their mutual adhesion during firing or would flow over the surfaces. Too great a proportion of the third ingredient would also result in an unduly high value of $E_{10}$. A preferred range of the proportion of the third ingredient is from about 0.05 to about 1.00%.

EXAMPLE 15

While all the foregoing EXAMPLES dealt with the ceramic compositions of the first, second and third ingredients, the present EXAMPLE introduces a fourth ingredient with a view to the higher coherency of the ceramic bodies. The particular fourth ingredient herein employed was GeO$_2$, in combination with SrTiO$_3$ as the first ingredient, Nb$_2$O$_5$ as the second ingredient, and CuO as the third ingredient, and in various sets of proportions presented in TABLE 15. These ingredients were processed into ceramic discs, and further into varistors, through the same procedure as in EXAMPLE 1 except that GeO$_2$ was used as the fourth ingredient and that the oxidative heat treatment of the fired bodies was performed at a temperature of 1000° C. TABLE 15 also indicates the $E_{10}$, α, and C of the varistors manufactured as above.

As is apparent from the tabulated results, the varistors containing the fourth ingredient have properties similar to those of the varistors having no fourth ingredient. The addition of GeO$_2$ as the fourth ingredient, however, made more uniform the size of the ceramic particles, which ranged from 20 to 40 micrometers, thereby serving to reduce fluctuations in the $E_{10}$ and α of the varistors.

TABLE 15

| Test No. | Composition in percent | | | | Properties | | |
|---|---|---|---|---|---|---|---|
| | SrTiO$_3$ | Nb$_2$O$_5$ | CuO | GeO$_2$ | $E_{10}$, V | α | C, nF |
| 1 | 99.48 | 0.01 | 0.01 | 0.5 | 8 | 5 | 101 |
| 2 | 99.44 | 0.05 | 0.01 | 0.5 | 3 | 4 | 107 |
| 3 | 99.39 | 0.10 | 0.01 | 0.5 | 2 | 4 | 120 |
| 4 | 98.49 | 1.00 | 0.01 | 0.5 | 6 | 5 | 101 |
| 5 | 96.99 | 2.50 | 0.01 | 0.5 | 11 | 5 | 96 |
| 6 | 99.44 | 0.01 | 0.05 | 0.5 | 9 | 5 | 97 |
| 7 | 99.40 | 0.05 | 0.05 | 0.5 | 3 | 4 | 101 |
| 8 | 99.35 | 0.10 | 0.05 | 0.5 | 2 | 4 | 116 |
| 9 | 98.45 | 1.00 | 0.05 | 0.5 | 7 | 5 | 99 |
| 10 | 96.95 | 2.50 | 0.05 | 0.5 | 12 | 5 | 95 |
| 11 | 99.39 | 0.01 | 0.10 | 0.5 | 10 | 6 | 89 |
| 12 | 99.35 | 0.05 | 0.10 | 0.5 | 4 | 4 | 100 |
| 13 | 99.30 | 0.10 | 0.10 | 0.5 | 3 | 4 | 117 |
| 14 | 98.40 | 1.00 | 0.10 | 0.5 | 8 | 6 | 92 |
| 15 | 96.90 | 2.50 | 0.10 | 0.5 | 14 | 7 | 86 |
| 16 | 98.49 | 0.01 | 1.00 | 0.5 | 18 | 8 | 82 |
| 17 | 98.45 | 0.05 | 1.00 | 0.5 | 10 | 6 | 92 |
| 18 | 98.40 | 0.10 | 1.00 | 0.5 | 7 | 6 | 105 |
| 19 | 97.50 | 1.00 | 1.00 | 0.5 | 14 | 8 | 85 |
| 20 | 96.00 | 2.50 | 1.00 | 0.5 | 33 | 11 | 61 |
| 21 | 94.49 | 0.01 | 5.00 | 0.5 | 35 | 12 | 66 |
| 22 | 94.45 | 0.05 | 5.00 | 0.5 | 24 | 9 | 79 |
| 23 | 94.40 | 0.10 | 5.00 | 0.5 | 16 | 8 | 91 |
| 24 | 93.50 | 1.00 | 5.00 | 0.5 | 26 | 10 | 76 |
| 25 | 92.00 | 2.50 | 5.00 | 0.5 | 89 | 32 | 33 |

EXAMPLE 16

SrTiO$_3$ as the first ingredient was combined with Nb$_2$O$_5$ as the second ingredient, Cu$_2$O as the third ingredient, and GeO$_2$ as the fourth ingredient. In various sets of proportions these ingredients were processed into ceramic discs, and further into varistors, through the same procedure as in EXAMPLE 1 except that the temperature of the oxidative heat treatment was 1000° C. TABLE 16 lists the proportions of the above four ingredients, together with the $E_{10}$, $\alpha$, and C of the varistors made therefrom, as measured by the same method as in EXAMPLE 1.

TABLE 16

| Test No. | Composition in percent | | | | Properties | | |
|---|---|---|---|---|---|---|---|
| | SrTiO$_3$ | Nb$_2$O$_5$ | Cu$_2$O | GeO$_2$ | $E_{10}$, V | $\alpha$ | C, nF |
| 1 | 99.48 | 0.01 | 0.01 | 0.5 | 9 | 4 | 76 |
| 2 | 99.44 | 0.05 | 0.01 | 0.5 | 4 | 4 | 87 |
| 3 | 99.39 | 0.10 | 0.01 | 0.5 | 2 | 4 | 98 |
| 4 | 98.49 | 1.00 | 0.01 | 0.5 | 5 | 4 | 86 |
| 5 | 96.99 | 2.50 | 0.01 | 0.5 | 14 | 6 | 71 |
| 6 | 99.44 | 0.01 | 0.05 | 0.5 | 10 | 5 | 75 |
| 7 | 99.40 | 0.05 | 0.05 | 0.5 | 4 | 4 | 83 |
| 8 | 99.35 | 0.10 | 0.05 | 0.5 | 2 | 4 | 100 |
| 9 | 98.45 | 1.00 | 0.05 | 0.5 | 6 | 4 | 81 |
| 10 | 96.95 | 2.50 | 0.05 | 0.5 | 16 | 7 | 73 |
| 11 | 99.39 | 0.01 | 0.10 | 0.5 | 12 | 6 | 72 |
| 12 | 99.35 | 0.05 | 0.10 | 0.5 | 5 | 5 | 81 |
| 13 | 99.30 | 0.10 | 0.10 | 0.5 | 3 | 4 | 92 |
| 14 | 98.40 | 1.00 | 0.10 | 0.5 | 6 | 4 | 82 |
| 15 | 96.90 | 2.50 | 0.10 | 0.5 | 17 | 8 | 62 |
| 16 | 98.49 | 0.01 | 1.00 | 0.5 | 33 | 11 | 61 |
| 17 | 98.45 | 0.05 | 1.00 | 0.5 | 14 | 7 | 74 |
| 18 | 98.40 | 0.10 | 1.00 | 0.5 | 7 | 5 | 82 |
| 19 | 97.50 | 1.00 | 1.00 | 0.5 | 18 | 8 | 63 |
| 20 | 96.00 | 2.50 | 1.00 | 0.5 | 49 | 15 | 43 |
| 21 | 96.99 | 0.01 | 2.50 | 0.5 | 65 | 21 | 36 |
| 22 | 96.95 | 0.05 | 2.50 | 0.5 | 29 | 10 | 51 |
| 23 | 96.90 | 0.10 | 2.50 | 0.5 | 15 | 7 | 77 |
| 24 | 96.00 | 1.00 | 2.50 | 0.5 | 36 | 10 | 51 |
| 25 | 94.50 | 2.50 | 2.50 | 0.5 | 95 | 34 | 29 |

EXAMPLE 17

SrTiO$_3$ as the first ingredient was combined with Nb$_2$O$_5$ as the second ingredient, V$_2$O$_5$ as the third ingredient, and GeO$_2$ as the fourth ingredient. In various sets of of proportions these ingredients were processed into ceramic discs, and further into varistors, through the same procedure as in EXAMPLE 1 except that the temperature of the oxidative heat treatment was 1000° C. TABLE 17 lists the proportions of the above four ingredients, together with the $E_{10}$, $\alpha$, and C of the varistors made therefrom, as measured by the same method as in EXAMPLE 1.

TABLE 17

| Test No. | Composition in percent | | | | Properties | | |
|---|---|---|---|---|---|---|---|
| | SrTiO$_3$ | Nb$_2$O$_5$ | V$_2$O$_5$ | GeO$_2$ | $E_{10}$, V | $\alpha$ | C, nF |
| 1 | 99.48 | 0.01 | 0.01 | 0.5 | 4 | 4 | 88 |
| 2 | 99.44 | 0.05 | 0.01 | 0.5 | 2 | 4 | 93 |
| 3 | 99.39 | 0.10 | 0.01 | 0.5 | 2 | 4 | 91 |
| 4 | 98.49 | 1.00 | 0.01 | 0.5 | 4 | 4 | 87 |
| 5 | 96.99 | 2.50 | 0.01 | 0.5 | 8 | 5 | 72 |
| 6 | 99.44 | 0.01 | 0.05 | 0.5 | 5 | 4 | 83 |
| 7 | 99.40 | 0.05 | 0.05 | 0.5 | 3 | 4 | 82 |
| 8 | 99.35 | 0.10 | 0.05 | 0.5 | 2 | 4 | 89 |
| 9 | 98.45 | 1.00 | 0.05 | 0.5 | 5 | 4 | 79 |
| 10 | 96.95 | 2.50 | 0.05 | 0.5 | 10 | 5 | 63 |
| 11 | 99.39 | 0.01 | 0.1 | 0.5 | 6 | 5 | 81 |
| 12 | 99.35 | 0.05 | 0.1 | 0.5 | 3 | 4 | 80 |
| 13 | 99.30 | 0.10 | 0.1 | 0.5 | 3 | 4 | 81 |
| 14 | 98.40 | 1.00 | 0.1 | 0.5 | 7 | 4 | 66 |
| 15 | 96.90 | 2.50 | 0.1 | 0.5 | 13 | 6 | 51 |
| 16 | 98.99 | 0.01 | 0.50 | 0.5 | 12 | 6 | 70 |
| 17 | 98.95 | 0.05 | 0.50 | 0.5 | 6 | 4 | 76 |
| 18 | 98.90 | 0.10 | 0.50 | 0.5 | 5 | 4 | 82 |
| 19 | 98.00 | 1.00 | 0.50 | 0.5 | 13 | 6 | 49 |
| 20 | 96.50 | 2.50 | 0.50 | 0.5 | 25 | 8 | 42 |
| 21 | 98.49 | 0.01 | 1.00 | 0.5 | 17 | 8 | 50 |
| 22 | 98.45 | 0.05 | 1.00 | 0.5 | 9 | 5 | 75 |
| 23 | 98.40 | 0.10 | 1.00 | 0.5 | 7 | 4 | 80 |
| 24 | 97.50 | 1.00 | 1.00 | 0.5 | 19 | 8 | 44 |
| 25 | 96.00 | 2.50 | 1.00 | 0.5 | 38 | 13 | 26 |

EXAMPLE 18

SrTiO$_3$ as the first ingredient was combined with Nb$_2$O$_5$ as the second ingredient, CrO$_3$ as the third ingredient, and GeO$_2$ as the fourth ingredient. In various sets of proportions these ingredients were processed into ceramic discs, and further into varistors, through the same procedure as in EXAMPLE 1 except that the temperature of the oxidative heat treatment was 1000° C. TABLE 18 lists the proportions of the above four ingredients, together with the $E_{10}$, $\alpha$, and C of the varistors made therefrom, as measured by the same method as in EXAMPLE 1.

TABLE 18

| Test No. | Composition in percent | | | | Properties | | |
|---|---|---|---|---|---|---|---|
| | SrTiO$_3$ | Nb$_2$O$_5$ | CrO$_3$ | GeO$_2$ | $E_{10}$, V | $\alpha$ | C, nF |
| 1 | 99.48 | 0.01 | 0.01 | 0.5 | 8 | 5 | 61 |
| 2 | 99.44 | 0.05 | 0.01 | 0.5 | 3 | 4 | 77 |
| 3 | 99.39 | 0.10 | 0.01 | 0.5 | 2 | 4 | 76 |
| 4 | 98.49 | 1.00 | 0.01 | 0.5 | 7 | 5 | 60 |
| 5 | 96.99 | 2.50 | 0.01 | 0.5 | 14 | 6 | 52 |
| 6 | 99.44 | 0.01 | 0.05 | 0.5 | 9 | 5 | 60 |
| 7 | 99.40 | 0.05 | 0.05 | 0.5 | 3 | 4 | 76 |
| 8 | 99.35 | 0.10 | 0.05 | 0.5 | 2 | 4 | 71 |
| 9 | 98.45 | 1.00 | 0.05 | 0.5 | 8 | 5 | 61 |
| 10 | 96.95 | 2.50 | 0.05 | 0.5 | 15 | 7 | 50 |
| 11 | 99.39 | 0.01 | 0.10 | 0.5 | 10 | 6 | 61 |
| 12 | 99.35 | 0.05 | 0.10 | 0.5 | 4 | 4 | 72 |
| 13 | 99.30 | 0.10 | 0.10 | 0.5 | 3 | 4 | 73 |
| 14 | 98.40 | 1.00 | 0.10 | 0.5 | 9 | 6 | 52 |
| 15 | 96.90 | 2.50 | 0.10 | 0.5 | 18 | 7 | 43 |
| 16 | 98.49 | 0.01 | 1.00 | 0.5 | 32 | 11 | 35 |
| 17 | 98.45 | 0.05 | 1.00 | 0.5 | 12 | 5 | 62 |
| 18 | 98.40 | 0.10 | 1.00 | 0.5 | 8 | 5 | 64 |
| 19 | 97.50 | 1.00 | 1.00 | 0.5 | 28 | 10 | 36 |
| 20 | 96.00 | 2.50 | 1.00 | 0.5 | 57 | 17 | 32 |
| 21 | 97.49 | 0.01 | 2.00 | 0.5 | 48 | 15 | 28 |
| 22 | 97.45 | 0.05 | 2.00 | 0.5 | 18 | 7 | 42 |
| 23 | 97.40 | 0.10 | 2.00 | 0.5 | 12 | 6 | 61 |
| 24 | 96.50 | 1.00 | 2.00 | 0.5 | 45 | 14 | 29 |
| 25 | 95.00 | 2.50 | 2.00 | 0.5 | 91 | 33 | 21 |

EXAMPLE 19

SrTiO$_3$ as the first ingredient was combined with Nb$_2$O$_5$ as the second ingredient, MoO$_3$ as the third ingredient, and GeO$_2$ as the fourth ingredient. In various sets of proportions these ingredients were processed into ceramic discs, and further into varistors, through the same procedure as in EXAMPLE 1 except that the temperature of the oxidative heat treatment was 1000° C. TABLE 19 lists the proportions of the above four ingredients, together with the $E_{10}$, $\alpha$, and C of the varistors made therefrom, as measured by the same method as in EXAMPLE 1.

TABLE 19

| Test No. | Composition in percent | | | | Properties | | |
|---|---|---|---|---|---|---|---|
| | SrTiO$_3$ | Nb$_2$O$_5$ | MoO$_3$ | GeO$_2$ | $E_{10}$, V | $\alpha$ | C, nF |
| 1 | 99.48 | 0.01 | 0.01 | 0.5 | 5 | 4 | 131 |
| 2 | 99.44 | 0.05 | 0.01 | 0.5 | 3 | 4 | 143 |
| 3 | 99.39 | 0.10 | 0.01 | 0.5 | 2 | 4 | 154 |
| 4 | 98.49 | 1.00 | 0.01 | 0.5 | 5 | 4 | 130 |
| 5 | 96.99 | 2.50 | 0.01 | 0.5 | 12 | 6 | 110 |
| 6 | 99.44 | 0.01 | 0.05 | 0.5 | 7 | 5 | 123 |
| 7 | 99.40 | 0.05 | 0.05 | 0.5 | 3 | 4 | 145 |
| 8 | 99.35 | 0.10 | 0.05 | 0.5 | 2 | 4 | 161 |
| 9 | 98.45 | 1.00 | 0.05 | 0.5 | 6 | 5 | 129 |
| 10 | 96.95 | 2.50 | 0.05 | 0.5 | 14 | 7 | 105 |
| 11 | 99.39 | 0.01 | 0.10 | 0.5 | 8 | 5 | 116 |
| 12 | 99.35 | 0.05 | 0.10 | 0.5 | 4 | 4 | 139 |
| 13 | 99.30 | 0.10 | 0.10 | 0.5 | 3 | 4 | 144 |
| 14 | 98.40 | 1.00 | 0.10 | 0.5 | 7 | 6 | 121 |
| 15 | 96.90 | 2.50 | 0.10 | 0.5 | 16 | 8 | 101 |

TABLE 19-continued

| Test No. | Composition in percent | | | | Properties | | |
|---|---|---|---|---|---|---|---|
| | $SrTiO_3$ | $Nb_2O_5$ | $MoO_3$ | $GeO_2$ | $E_{10}$, V | $\alpha$ | C, nF |
| 16 | 98.49 | 0.01 | 1.00 | 0.5 | 21 | 9 | 93 |
| 17 | 98.45 | 0.05 | 1.00 | 0.5 | 11 | 6 | 106 |
| 18 | 98.40 | 0.10 | 1.00 | 0.5 | 5 | 4 | 137 |
| 19 | 97.50 | 1.00 | 1.00 | 0.5 | 18 | 8 | 99 |
| 20 | 96.00 | 2.50 | 1.00 | 0.5 | 42 | 14 | 63 |
| 21 | 94.49 | 0.01 | 5.00 | 0.5 | 39 | 12 | 72 |
| 22 | 94.45 | 0.05 | 5.00 | 0.5 | 20 | 9 | 96 |
| 23 | 94.40 | 0.10 | 5.00 | 0.5 | 13 | 7 | 106 |
| 24 | 93.50 | 1.00 | 5.00 | 0.5 | 33 | 11 | 79 |
| 25 | 92.00 | 2.50 | 5.00 | 0.5 | 78 | 27 | 46 |

EXAMPLE 20

$SrTiO_3$ as the first ingredient was combined with $Nb_2O_5$ as the second ingredient, $MnO_2$ as the third ingredient, and $GeO_2$ as the fourth ingredient. In various sets of proportions these ingredients were processed into ceramic discs, and further into varistors, through the same procedure as in EXAMPLE 1 except that the temperature of the oxidative heat treatment was 1000° C. TABLE 20 lists the proportions of the above four ingredients, together with the $E_{10}$, $\alpha$, and C of the varistors made therefrom, as measured by the same method as in EXAMPLE 1.

TABLE 20

| Test No. | Composition in percent | | | | Properties | | |
|---|---|---|---|---|---|---|---|
| | $SrTiO_3$ | $Nb_2O_5$ | $MnO_2$ | $GeO_2$ | $E_{10}$, V | $\alpha$ | C, nF |
| 1 | 99.48 | 0.01 | 0.01 | 0.5 | 9 | 5 | 121 |
| 2 | 99.44 | 0.05 | 0.01 | 0.5 | 5 | 4 | 130 |
| 3 | 99.39 | 0.10 | 0.01 | 0.5 | 2 | 4 | 141 |
| 4 | 98.49 | 1.00 | 0.01 | 0.5 | 6 | 5 | 125 |
| 5 | 96.99 | 2.50 | 0.01 | 0.5 | 11 | 5 | 115 |
| 6 | 99.44 | 0.01 | 0.05 | 0.5 | 12 | 6 | 109 |
| 7 | 99.40 | 0.05 | 0.05 | 0.5 | 6 | 4 | 123 |
| 8 | 99.35 | 0.10 | 0.05 | 0.5 | 3 | 4 | 135 |
| 9 | 98.45 | 1.00 | 0.05 | 0.5 | 8 | 5 | 115 |
| 10 | 96.95 | 2.50 | 0.05 | 0.5 | 13 | 6 | 105 |
| 11 | 99.39 | 0.01 | 0.10 | 0.5 | 14 | 7 | 103 |
| 12 | 99.35 | 0.05 | 0.10 | 0.5 | 8 | 5 | 113 |
| 13 | 99.30 | 0.10 | 0.10 | 0.5 | 3 | 4 | 139 |
| 14 | 98.40 | 1.00 | 0.10 | 0.5 | 10 | 5 | 110 |
| 15 | 96.90 | 2.50 | 0.10 | 0.5 | 18 | 7 | 96 |
| 16 | 98.49 | 0.01 | 1.00 | 0.5 | 42 | 15 | 71 |
| 17 | 98.45 | 0.05 | 1.00 | 0.5 | 24 | 8 | 89 |
| 18 | 98.40 | 0.10 | 1.00 | 0.5 | 9 | 5 | 120 |
| 19 | 97.50 | 1.00 | 1.00 | 0.5 | 28 | 10 | 89 |
| 20 | 96.00 | 2.50 | 1.00 | 0.5 | 52 | 19 | 66 |
| 21 | 96.99 | 0.01 | 2.50 | 0.5 | 72 | 30 | 48 |
| 22 | 96.95 | 0.05 | 2.50 | 0.5 | 41 | 14 | 62 |
| 23 | 96.90 | 0.10 | 2.50 | 0.5 | 17 | 7 | 96 |
| 24 | 96.00 | 1.00 | 2.50 | 0.5 | 47 | 16 | 59 |
| 25 | 94.50 | 2.50 | 2.50 | 0.5 | 90 | 36 | 33 |

EXAMPLE 21

$SrTiO_3$ as the first ingredient and CuO as the third ingredient were variously combined with a second ingredient selected from the group of $Ta_2O_5$, $WO_3$, $La_2O_3$, $Dy_2O_3$, $Y_2O_3$, $CeO_2$, $Nb_2O_5$, $Pr_6O_{11}$, $Nd_2O_3$, and $Sm_2O_3$, and with a fourth ingredient selected from the group of $B_2O_3$, ZnO, PbO, and $GeO_2$. This EXAMPLE was intended to prove that $B_2O_3$, ZnO and PbO could each be used as the fourth ingredient, in place of $GeO_2$ tested in some foregoing EXAMPLES. It was also intended to ascertain the allowable range of percentages in which the fourth ingredient might be used to provide ceramic materials suitable for varistors.

Various combinations of four selected ingredients, each in various sets of proportions, were processed into ceramic discs through the same procedure as in EXAMPLE 1 except that the temperature of the oxidative heat treatment was 1000° C. TABLES 21A through 21S represent the various combinations and proportions of the above ingredients, as well as the resistivities of the corresponding ceramic bodies, as measured by the four-probe method.

The resistivity of each ceramic body serves as a measure of its utility as a semiconductor. Conventional $SrTiO_3$ ceramic materials, for use in capacitors, had a resistivity of more than $10^{10}$ ohm-cm in general. Contrastively, as will be noted from TABLES 21A through 21S, the ceramic bodies of this invention have all a resistivity of less than $10^6$ ohm-cm and thus are sufficiently semiconductive and suitable for varistors.

Experiment has also proved that if the content of the fourth ingredient in each composition is less than about 0.01%, it hardly serves the purpose of improving the coherency of the ceramic bodies prepared therefrom. Should the proportion of the fourth ingredient exceed about 4.00%, on the other hand, the resistivity of the ceramic bodies will become too high, making them unsuitable for varistors. Thus the proportion of the fourth ingredient should range from about 0.01 to about 4.00%, preferably from about 0.5 to about 1.0%.

TABLE 21A

| Test No. | Composition in percent | | | | Resistivity, ohm-cm |
|---|---|---|---|---|---|
| | $SrTiO_3$ | $Ta_2O_5$ | CuO | $B_2O_3$ | |
| 1 | 99.485 | 0.005 | 0.5 | 0.01 | $6 \times 10^{-1}$ |
| 2 | 98.995 | 0.005 | 0.5 | 0.50 | $13 \times 10^{-1}$ |
| 3 | 95.495 | 0.005 | 0.5 | 4.00 | $19 \times 10^{-1}$ |
| 4 | 98.99 | 0.50 | 0.5 | 0.01 | $2 \times 10^{-1}$ |
| 5 | 98.50 | 0.50 | 0.5 | 0.50 | $5 \times 10^{-1}$ |
| 6 | 95.00 | 0.50 | 0.5 | 4.00 | $7 \times 10^{-1}$ |
| 7 | 96.99 | 2.50 | 0.5 | 0.01 | $9 \times 10^{-1}$ |
| 8 | 96.50 | 2.50 | 0.5 | 0.50 | $20 \times 10^{-1}$ |
| 9 | 93.00 | 2.50 | 0.5 | 4.00 | $31 \times 10^{-1}$ |

TABLE 21B

| Test No. | Composition in percent | | | | Resistivity, ohm-cm |
|---|---|---|---|---|---|
| | $SrTiO_3$ | $WO_3$ | CuO | $B_2O_3$ | |
| 10 | 99.48 | 0.01 | 0.5 | 0.01 | $6 \times 10^{-1}$ |
| 11 | 98.99 | 0.01 | 0.5 | 0.50 | $13 \times 10^{-1}$ |
| 12 | 95.49 | 0.01 | 0.5 | 4.00 | $19 \times 10^{-1}$ |
| 13 | 98.99 | 0.50 | 0.5 | 0.01 | $2 \times 10^{-1}$ |
| 14 | 98.50 | 0.50 | 0.5 | 0.50 | $5 \times 10^{-1}$ |
| 15 | 95.00 | 0.50 | 0.5 | 4.00 | $7 \times 10^{-1}$ |
| 16 | 94.49 | 5.00 | 0.5 | 0.01 | $9 \times 10^{-1}$ |
| 17 | 94.00 | 5.00 | 0.5 | 0.50 | $20 \times 10^{-1}$ |
| 18 | 95.50 | 5.00 | 0.5 | 4.00 | $31 \times 10^{-1}$ |

TABLE 21C

| Test No. | Composition in percent | | | | Resistivity, ohm-cm |
|---|---|---|---|---|---|
| | $SrTiO_3$ | $La_2O_3$ | CuO | $B_2O_3$ | |
| 19 | 99.48 | 0.01 | 0.5 | 0.01 | $5 \times 10^{-1}$ |
| 20 | 98.99 | 0.01 | 0.5 | 0.50 | $7 \times 10^{-1}$ |
| 21 | 95.49 | 0.01 | 0.5 | 4.00 | $17 \times 10^{-1}$ |
| 22 | 98.99 | 0.50 | 0.5 | 0.01 | $2 \times 10^{-1}$ |
| 23 | 98.50 | 0.50 | 0.5 | 0.50 | $4 \times 10^{-1}$ |
| 24 | 95.00 | 0.50 | 0.5 | 4.00 | $6 \times 10^{-1}$ |
| 25 | 96.99 | 2.50 | 0.5 | 0.01 | $4 \times 10^{-1}$ |
| 26 | 96.50 | 2.50 | 0.5 | 0.50 | $6 \times 10^{-1}$ |
| 27 | 93.00 | 2.50 | 0.5 | 4.00 | $13 \times 10^{-1}$ |

TABLE 21D

| Test No. | Composition in percent | | | | Resistivity, ohm-cm |
|---|---|---|---|---|---|
| | $SrTiO_3$ | $Dy_2O_3$ | CuO | $B_2O_3$ | |
| 28 | 99.48 | 0.01 | 0.5 | 0.01 | $7 \times 10^{-1}$ |

TABLE 21D-continued

| Test No. | Composition in percent SrTiO$_3$ | Dy$_2$O$_3$ | CuO | B$_2$O$_3$ | Resistivity, ohm-cm |
|---|---|---|---|---|---|
| 29 | 98.99 | 0.01 | 0.5 | 0.50 | $13 \times 10^{-1}$ |
| 30 | 95.49 | 0.01 | 0.5 | 4.00 | $23 \times 10^{-1}$ |
| 31 | 98.99 | 0.50 | 0.5 | 0.01 | $3 \times 10^{-1}$ |
| 32 | 98.50 | 0.50 | 0.5 | 0.50 | $5 \times 10^{-1}$ |
| 33 | 95.00 | 0.50 | 0.5 | 4.00 | $11 \times 10^{-1}$ |
| 34 | 96.99 | 2.50 | 0.5 | 0.01 | $6 \times 10^{-1}$ |
| 35 | 96.50 | 2.50 | 0.5 | 0.50 | $11 \times 10^{-1}$ |
| 36 | 93.00 | 2.50 | 0.5 | 4.00 | $20 \times 10^{-1}$ |

TABLE 21E

| Test No. | Composition in percent SrTiO$_3$ | Y$_2$O$_3$ | CuO | B$_2$O$_3$ | Resistivity, ohm-cm |
|---|---|---|---|---|---|
| 37 | 99.48 | 0.01 | 0.5 | 0.01 | $7 \times 10^{-1}$ |
| 38 | 98.99 | 0.01 | 0.5 | 0.50 | $12 \times 10^{-1}$ |
| 39 | 95.49 | 0.01 | 0.5 | 4.00 | $24 \times 10^{-1}$ |
| 40 | 98.99 | 0.50 | 0.5 | 0.01 | $2 \times 10^{-1}$ |
| 41 | 98.50 | 0.50 | 0.5 | 0.50 | $3 \times 10^{-1}$ |
| 42 | 95.00 | 0.50 | 0.5 | 4.00 | $7 \times 10^{-1}$ |
| 43 | 95.49 | 4.00 | 0.5 | 0.01 | $7 \times 10^{-1}$ |
| 44 | 95.00 | 4.00 | 0.5 | 0.50 | $12 \times 10^{-1}$ |
| 45 | 91.50 | 4.00 | 0.5 | 4.00 | $25 \times 10^{-1}$ |

TABLE 21F

| Test No. | Composition in percent SrTiO$_3$ | CeO$_2$ | CuO | ZnO | Resistivity, ohm-cm |
|---|---|---|---|---|---|
| 46 | 99.48 | 0.01 | 0.5 | 0.01 | $8 \times 10^{-1}$ |
| 47 | 98.99 | 0.01 | 0.5 | 0.50 | $15 \times 10^{-1}$ |
| 48 | 95.49 | 0.01 | 0.5 | 4.00 | $33 \times 10^{-1}$ |
| 49 | 98.99 | 0.50 | 0.5 | 0.01 | $5 \times 10^{-1}$ |
| 50 | 98.50 | 0.50 | 0.5 | 0.50 | $10 \times 10^{-1}$ |
| 51 | 95.00 | 0.50 | 0.5 | 4.00 | $21 \times 10^{-1}$ |
| 52 | 95.49 | 4.00 | 0.5 | 0.01 | $9 \times 10^{-1}$ |
| 53 | 95.00 | 4.00 | 0.5 | 0.50 | $17 \times 10^{-1}$ |
| 54 | 91.50 | 4.00 | 0.5 | 4.00 | $35 \times 10^{-1}$ |

TABLE 21G

| Test No. | Composition in percent SrTiO$_3$ | La$_2$O$_3$ | CuO | ZnO | Resistivity, ohm-cm |
|---|---|---|---|---|---|
| 55 | 99.48 | 0.01 | 0.5 | 0.01 | $7 \times 10^{-1}$ |
| 56 | 98.99 | 0.01 | 0.5 | 0.50 | $13 \times 10^{-1}$ |
| 57 | 95.49 | 0.01 | 0.5 | 4.00 | $27 \times 10^{-1}$ |
| 58 | 98.99 | 0.50 | 0.5 | 0.01 | $4 \times 10^{-1}$ |
| 59 | 98.50 | 0.50 | 0.5 | 0.50 | $9 \times 10^{-1}$ |
| 60 | 95.00 | 0.50 | 0.5 | 4.00 | $16 \times 10^{-1}$ |
| 61 | 96.99 | 2.50 | 0.5 | 0.01 | $6 \times 10^{-1}$ |
| 62 | 96.50 | 2.50 | 0.5 | 0.50 | $12 \times 10^{-1}$ |
| 63 | 93.00 | 2.50 | 0.5 | 4.00 | $25 \times 10^{-1}$ |

TABLE 21H

| Test No. | Composition in percent SrTiO$_3$ | WO$_3$ | CuO | ZnO | Resistivity, ohm-cm |
|---|---|---|---|---|---|
| 64 | 99.48 | 0.01 | 0.5 | 0.01 | $5 \times 10^{-1}$ |
| 65 | 98.99 | 0.01 | 0.5 | 0.50 | $9 \times 10^{-1}$ |
| 66 | 95.49 | 0.01 | 0.5 | 4.00 | $20 \times 10^{-1}$ |
| 67 | 98.99 | 0.50 | 0.5 | 0.01 | $2 \times 10^{-1}$ |
| 68 | 98.50 | 0.50 | 0.5 | 0.50 | $4 \times 10^{-1}$ |
| 69 | 95.00 | 0.50 | 0.5 | 4.00 | $8 \times 10^{-1}$ |
| 70 | 94.49 | 5.00 | 0.5 | 0.01 | $4 \times 10^{-1}$ |
| 71 | 94.00 | 5.00 | 0.5 | 0.50 | $8 \times 10^{-1}$ |
| 72 | 90.50 | 5.00 | 0.5 | 4.00 | $16 \times 10^{-1}$ |

TABLE 21I

| Test No. | Composition in percent SrTiO$_3$ | Ta$_2$O$_5$ | CuO | ZnO | Resistivity, ohm-cm |
|---|---|---|---|---|---|
| 73 | 99.485 | 0.005 | 0.5 | 0.01 | $9 \times 10^{-1}$ |
| 74 | 98.995 | 0.005 | 0.5 | 0.50 | $17 \times 10^{-1}$ |

TABLE 21I-continued

| Test No. | Composition in percent SrTiO$_3$ | Ta$_2$O$_5$ | CuO | ZnO | Resistivity, ohm-cm |
|---|---|---|---|---|---|
| 75 | 95.495 | 0.005 | 0.5 | 4.00 | $36 \times 10^{-1}$ |
| 76 | 99.44 | 0.05 | 0.5 | 0.01 | $4 \times 10^{-1}$ |
| 77 | 98.95 | 0.05 | 0.5 | 0.50 | $8 \times 10^{-1}$ |
| 78 | 95.45 | 0.05 | 0.5 | 4.00 | $15 \times 10^{-1}$ |
| 79 | 96.99 | 2.50 | 0.5 | 0.01 | $13 \times 10^{-1}$ |
| 80 | 96.50 | 2.50 | 0.5 | 0.50 | $24 \times 10^{-1}$ |
| 81 | 93.00 | 2.50 | 0.5 | 4.00 | $48 \times 10^{-1}$ |

TABLE 21J

| Test No. | Composition in percent SrTiO$_3$ | Ta$_2$O$_5$ | CuO | PbO | Resistivity, ohm-cm |
|---|---|---|---|---|---|
| 82 | 99.485 | 0.005 | 0.5 | 0.01 | $7 \times 10^{-1}$ |
| 83 | 98.995 | 0.005 | 0.5 | 0.50 | $15 \times 10^{-1}$ |
| 84 | 95.495 | 0.005 | 0.5 | 4.00 | $31 \times 10^{-1}$ |
| 85 | 98.99 | 0.50 | 0.5 | 0.01 | $4 \times 10^{-1}$ |
| 86 | 98.50 | 0.50 | 0.5 | 0.50 | $8 \times 10^{-1}$ |
| 87 | 95.00 | 0.50 | 0.5 | 4.00 | $18 \times 10^{-1}$ |
| 88 | 96.99 | 2.50 | 0.5 | 0.01 | $10 \times 10^{-1}$ |
| 89 | 96.50 | 2.50 | 0.5 | 0.50 | $21 \times 10^{-1}$ |
| 90 | 93.00 | 2.50 | 0.5 | 4.00 | $45 \times 10^{-1}$ |

TABLE 21K

| Test No. | Composition in percent SrTiO$_3$ | Nb$_2$O$_5$ | CuO | PbO | Resistivity, ohm-cm |
|---|---|---|---|---|---|
| 91 | 99.48 | 0.01 | 0.5 | 0.01 | $21 \times 10^{-1}$ |
| 92 | 98.99 | 0.01 | 0.5 | 0.50 | $44 \times 10^{-1}$ |
| 93 | 95.49 | 0.01 | 0.5 | 4.00 | $96 \times 10^{-1}$ |
| 94 | 98.99 | 0.50 | 0.5 | 0.01 | $7 \times 10^{-1}$ |
| 95 | 98.50 | 0.50 | 0.5 | 0.50 | $15 \times 10^{-1}$ |
| 96 | 95.00 | 0.50 | 0.5 | 4.00 | $30 \times 10^{-1}$ |
| 97 | 94.49 | 5.00 | 0.5 | 0.01 | $18 \times 10^{-1}$ |
| 98 | 94.00 | 5.00 | 0.5 | 0.50 | $39 \times 10^{-1}$ |
| 99 | 90.50 | 5.00 | 0.5 | 4.00 | $81 \times 10^{-1}$ |

TABLE 21L

| Test No. | Composition in percent SrTiO$_3$ | Pr$_6$O$_{11}$ | CuO | PbO | Resistivity, ohm-cm |
|---|---|---|---|---|---|
| 100 | 99.489 | 0.001 | 0.5 | 0.01 | $8 \times 10^{-1}$ |
| 101 | 98.999 | 0.001 | 0.5 | 0.50 | $17 \times 10^{-1}$ |
| 102 | 95.499 | 0.001 | 0.5 | 4.00 | $39 \times 10^{-1}$ |
| 103 | 98.99 | 0.50 | 0.5 | 0.01 | $4 \times 10^{-1}$ |
| 104 | 98.50 | 0.50 | 0.5 | 0.50 | $9 \times 10^{-1}$ |
| 105 | 95.00 | 0.50 | 0.5 | 4.00 | $18 \times 10^{-1}$ |
| 106 | 96.99 | 2.50 | 0.5 | 0.01 | $7 \times 10^{-1}$ |
| 107 | 96.50 | 2.50 | 0.5 | 0.50 | $16 \times 10^{-1}$ |
| 108 | 93.00 | 2.50 | 0.5 | 4.00 | $32 \times 10^{-1}$ |

TABLE 21M

| Test No. | Composition in percent SrTiO$_3$ | Nd$_2$O$_3$ | CuO | PbO | Resistivity, ohm-cm |
|---|---|---|---|---|---|
| 109 | 99.48 | 0.01 | 0.5 | 0.01 | $8 \times 10^{-1}$ |
| 110 | 98.99 | 0.01 | 0.5 | 0.50 | $16 \times 10^{-1}$ |
| 111 | 95.49 | 0.01 | 0.5 | 4.00 | $36 \times 10^{-1}$ |
| 112 | 98.99 | 0.50 | 0.5 | 0.01 | $3 \times 10^{-1}$ |
| 113 | 98.50 | 0.50 | 0.5 | 0.50 | $6 \times 10^{-1}$ |
| 114 | 95.00 | 0.50 | 0.5 | 4.00 | $13 \times 10^{-1}$ |
| 115 | 95.49 | 4.00 | 0.5 | 0.01 | $7 \times 10^{-1}$ |
| 116 | 95.00 | 4.00 | 0.5 | 0.50 | $15 \times 10^{-1}$ |
| 117 | 91.50 | 4.00 | 0.5 | 4.00 | $33 \times 10^{-1}$ |

TABLE 21N

| Test No. | Composition in percent SrTiO$_3$ | Sm$_2$O$_3$ | CuO | PbO | Resistivity, ohm-cm |
|---|---|---|---|---|---|
| 118 | 99.48 | 0.01 | 0.5 | 0.01 | $9 \times 10^{-1}$ |
| 119 | 98.99 | 0.01 | 0.5 | 0.50 | $20 \times 10^{-1}$ |
| 120 | 95.49 | 0.01 | 0.5 | 4.00 | $41 \times 10^{-1}$ |

TABLE 21N-continued

| Test No. | Composition in percent | | | | Resistivity, ohm-cm |
|---|---|---|---|---|---|
| | SrTiO₃ | Sm₂O₃ | CuO | PbO | |
| 121 | 98.99 | 0.50 | 0.5 | 0.01 | $3 \times 10^{-1}$ |
| 122 | 98.50 | 0.50 | 0.5 | 0.50 | $6 \times 10^{-1}$ |
| 123 | 95.00 | 0.50 | 0.5 | 4.00 | $11 \times 10^{-1}$ |
| 124 | 96.49 | 3.00 | 0.5 | 0.01 | $10 \times 10^{-1}$ |
| 125 | 96.00 | 3.00 | 0.5 | 0.50 | $23 \times 10^{-1}$ |
| 126 | 92.50 | 3.00 | 0.5 | 4.00 | $46 \times 10^{-1}$ |

TABLE 21-O

| Test No. | Composition in percent | | | | Resistivity, ohm-cm |
|---|---|---|---|---|---|
| | SrTiO₃ | Ta₂O₅ | CuO | GeO₂ | |
| 127 | 99.485 | 0.005 | 0.5 | 0.01 | $8 \times 10^{-1}$ |
| 128 | 98.995 | 0.005 | 0.5 | 0.50 | $17 \times 10^{-1}$ |
| 129 | 95.495 | 0.005 | 0.5 | 4.00 | $33 \times 10^{-1}$ |
| 130 | 98.99 | 0.50 | 0.5 | 0.01 | $4 \times 10^{-1}$ |
| 131 | 98.50 | 0.50 | 0.5 | 0.50 | $9 \times 10^{-1}$ |
| 132 | 95.00 | 0.50 | 0.5 | 4.00 | $18 \times 10^{-1}$ |
| 133 | 96.99 | 2.50 | 0.5 | 0.01 | $11 \times 10^{-1}$ |
| 134 | 96.50 | 2.50 | 0.5 | 0.50 | $25 \times 10^{-1}$ |
| 135 | 93.00 | 2.50 | 0.5 | 4.00 | $45 \times 10^{-1}$ |

TABLE 21P

| Test No. | Composition in percent | | | | Resistivity, ohm-cm |
|---|---|---|---|---|---|
| | SrTiO₃ | Nb₂O₅ | CuO | GeO₂ | |
| 136 | 99.48 | 0.01 | 0.5 | 0.01 | $29 \times 10^{-1}$ |
| 137 | 98.99 | 0.01 | 0.5 | 0.50 | $57 \times 10^{-1}$ |
| 138 | 95.49 | 0.01 | 0.5 | 4.00 | $122 \times 10^{-1}$ |
| 139 | 98.99 | 0.50 | 0.5 | 0.01 | $10 \times 10^{-1}$ |
| 140 | 98.50 | 0.50 | 0.5 | 0.50 | $24 \times 10^{-1}$ |
| 141 | 95.00 | 0.50 | 0.5 | 4.00 | $46 \times 10^{-1}$ |
| 142 | 94.49 | 5.00 | 0.5 | 0.01 | $24 \times 10^{-1}$ |
| 143 | 94.00 | 5.00 | 0.5 | 0.50 | $53 \times 10^{-1}$ |
| 144 | 90.50 | 5.00 | 0.5 | 4.00 | $103 \times 10^{-1}$ |

TABLE 21Q

| Test No. | Composition in percent | | | | Resistivity, ohm-cm |
|---|---|---|---|---|---|
| | SrTiO₃ | CeO₂ | CuO | GeO₂ | |
| 145 | 99.48 | 0.01 | 0.5 | 0.01 | $9 \times 10^{-1}$ |
| 146 | 98.99 | 0.01 | 0.5 | 0.50 | $21 \times 10^{-1}$ |
| 147 | 95.49 | 0.01 | 0.5 | 4.00 | $40 \times 10^{-1}$ |
| 148 | 98.99 | 0.50 | 0.5 | 0.01 | $6 \times 10^{-1}$ |
| 149 | 98.50 | 0.50 | 0.5 | 0.50 | $13 \times 10^{-1}$ |
| 150 | 95.00 | 0.50 | 0.5 | 4.00 | $27 \times 10^{-1}$ |
| 151 | 95.49 | 4.00 | 0.5 | 0.01 | $8 \times 10^{-1}$ |
| 152 | 95.00 | 4.00 | 0.5 | 0.50 | $18 \times 10^{-1}$ |
| 153 | 91.50 | 4.00 | 0.5 | 4.00 | $35 \times 10^{-1}$ |

TABLE 21R

| Test No. | Composition in percent | | | | Resistivity, ohm-cm |
|---|---|---|---|---|---|
| | SrTiO₃ | Nd₂O₃ | CuO | GeO₂ | |
| 154 | 99.48 | 0.01 | 0.5 | 0.01 | $10 \times 10^{-1}$ |
| 155 | 98.99 | 0.01 | 0.5 | 0.50 | $23 \times 10^{-1}$ |
| 156 | 95.49 | 0.01 | 0.5 | 4.00 | $46 \times 10^{-1}$ |
| 157 | 98.99 | 0.50 | 0.5 | 0.01 | $5 \times 10^{-1}$ |
| 158 | 98.50 | 0.50 | 0.5 | 0.50 | $11 \times 10^{-1}$ |
| 159 | 95.00 | 0.50 | 0.5 | 4.00 | $22 \times 10^{-1}$ |
| 160 | 95.49 | 4.00 | 0.5 | 0.01 | $9 \times 10^{-1}$ |
| 161 | 95.00 | 4.00 | 0.5 | 0.50 | $23 \times 10^{-1}$ |
| 162 | 91.50 | 4.00 | 0.5 | 4.00 | $44 \times 10^{-1}$ |

TABLE 21S

| Test No. | Composition in percent | | | | Resistivity, ohm-cm |
|---|---|---|---|---|---|
| | SrTiO₃ | Y₂O₃ | CuO | GeO₂ | |
| 163 | 99.48 | 0.01 | 0.5 | 0.01 | $8 \times 10^{-1}$ |
| 164 | 98.99 | 0.01 | 0.5 | 0.50 | $20 \times 10^{-1}$ |
| 165 | 95.49 | 0.01 | 0.5 | 4.00 | $37 \times 10^{-1}$ |
| 166 | 98.99 | 0.50 | 0.5 | 0.01 | $5 \times 10^{-1}$ |
| 167 | 98.50 | 0.50 | 0.5 | 0.50 | $12 \times 10^{-1}$ |
| 168 | 95.00 | 0.50 | 0.5 | 4.00 | $24 \times 10^{-1}$ |
| 169 | 95.49 | 4.00 | 0.5 | 0.01 | $11 \times 10^{-1}$ |
| 170 | 95.00 | 4.00 | 0.5 | 0.50 | $23 \times 10^{-1}$ |
| 171 | 91.50 | 4.00 | 0.5 | 4.00 | $41 \times 10^{-1}$ |

EXAMPLE 22

Fifteen different combinations of ingredients in accordance with the invention were prepared as in TABLES 22A through 22-0, in order to make sure that two or more different metal oxides could be employed as the second, third, or fourth set of ingredients, in combination with SrTiO₃ as the first ingredient. The various combinations of ingredients, each in several different sets of proportions, were processed into ceramic discs through the same procedure as in EXAMPLE 1 except that the temperature of the oxidative heat treatment was 1000° C. The resistivities of these ceramic bodies, measured by the same method as in EXAMPLE 21, were as given in TABLES 22A through 22-0. The tabulated results demonstrate that the ceramic bodies made with the use of two or more different metal oxides as the second, third, or fourth set of ingredients are all sufficiently semiconductive.

TABLE 22A

| Test No. | Composition in percent | | | | | | | Resistivity, ohm-cm |
|---|---|---|---|---|---|---|---|---|
| | First ingredient | Second ingredients | | Third ingredient | Fourth ingredients | | | |
| | SrTiO₃ | Nb₂O₅ | Ta₂O₅ | CuO | GeO₂ | PbO | ZnO | |
| 1 | 98.90 | 0.02 | 0.08 | 0.5 | 0.5 | 0 | 0 | $5 \times 10^{-1}$ |
| 2 | 98.90 | 0.05 | 0.05 | 0.5 | 0.5 | 0 | 0 | $7 \times 10^{-1}$ |
| 3 | 98.90 | 0.08 | 0.02 | 0.5 | 0.5 | 0 | 0 | $6 \times 10^{-1}$ |
| 4 | 98.90 | 0.02 | 0.08 | 0.5 | 0 | 0.5 | 0 | $7 \times 10^{-1}$ |
| 5 | 98.90 | 0.05 | 0.05 | 0.5 | 0 | 0.5 | 0 | $3 \times 10^{-1}$ |
| 6 | 98.90 | 0.08 | 0.02 | 0.5 | 0 | 0.5 | 0 | $4 \times 10^{-1}$ |
| 7 | 98.90 | 0.02 | 0.08 | 0.5 | 0 | 0 | 0.5 | $9 \times 10^{-1}$ |
| 8 | 98.90 | 0.05 | 0.05 | 0.5 | 0 | 0 | 0.5 | $11 \times 10^{-1}$ |
| 9 | 98.90 | 0.08 | 0.02 | 0.5 | 0 | 0 | 0.5 | $7 \times 10^{-1}$ |

TABLE 22B

| Test No. | Composition in percent | | | | | | | Resistivity, ohm-cm |
|---|---|---|---|---|---|---|---|---|
| | First ingredient | Second ingredients | | Third ingredient | Fourth ingredients | | | |
| | SrTiO₃ | Nb₂O₅ | WO₃ | CuO | GeO₂ | PbO | ZnO | |
| 10 | 98.90 | 0.02 | 0.08 | 0.5 | 0.5 | 0 | 0 | $7 \times 10^{-1}$ |
| 11 | 98.90 | 0.05 | 0.05 | 0.5 | 0.5 | 0 | 0 | $9 \times$ |

TABLE 22B-continued

| Test No. | Composition in percent ||||||| Resistivity, ohm-cm |
|---|---|---|---|---|---|---|---|---|
| | First ingredient | Second ingredients || Third ingredient | Fourth ingredients ||| |
| | SrTiO$_3$ | Nb$_2$O$_5$ | WO$_3$ | CuO | GeO$_2$ | PbO | ZnO | |
| 12 | 98.90 | 0.08 | 0.02 | 0.5 | 0.5 | 0 | 0 | 6 × 10$^{-1}$ |
| 13 | 98.90 | 0.02 | 0.08 | 0.5 | 0 | 0.5 | 0 | 4 × 10$^{-1}$ |
| 14 | 98.90 | 0.05 | 0.05 | 0.5 | 0 | 0.5 | 0 | 5 × 10$^{-1}$ |
| 15 | 98.90 | 0.08 | 0.02 | 0.5 | 0 | 0.5 | 0 | 4 × 10$^{-1}$ |
| 16 | 98.90 | 0.02 | 0.08 | 0.5 | 0 | 0 | 0.5 | 6 × 10$^{-1}$ |
| 17 | 98.90 | 0.05 | 0.05 | 0.5 | 0 | 0 | 0.5 | 7 × 10$^{-1}$ |
| 18 | 98.90 | 0.08 | 0.02 | 0.5 | 0 | 0 | 0.5 | 3 × 10$^{-1}$ |

TABLE 22C

| Test No. | Composition in percent ||||||| Resistivity, ohm-cm |
|---|---|---|---|---|---|---|---|---|
| | First ingredient | Second ingredients || Third ingredient | Fourth ingredients ||| |
| | SrTiO$_3$ | Nb$_2$O$_5$ | La$_2$O$_3$ | CuO | GeO$_2$ | PbO | ZnO | |
| 19 | 98.90 | 0.02 | 0.08 | 0.5 | 0.5 | 0 | 0 | 8 × 10$^{-1}$ |
| 20 | 98.90 | 0.05 | 0.05 | 0.5 | 0.5 | 0 | 0 | 13 × 10$^{-1}$ |
| 21 | 98.90 | 0.08 | 0.02 | 0.5 | 0.5 | 0 | 0 | 15 × 10$^{-1}$ |
| 22 | 98.90 | 0.02 | 0.08 | 0.5 | 0 | 0.5 | 0 | 10 × 10$^{-1}$ |
| 23 | 98.90 | 0.05 | 0.05 | 0.5 | 0 | 0.5 | 0 | 16 × 10$^{-1}$ |
| 24 | 98.90 | 0.08 | 0.02 | 0.5 | 0 | 0.5 | 0 | 21 × 10$^{-1}$ |
| 25 | 98.90 | 0.02 | 0.08 | 0.5 | 0 | 0 | 0.5 | 14 × 10$^{-1}$ |
| 26 | 98.90 | 0.05 | 0.05 | 0.5 | 0 | 0 | 0.5 | 15 × 10$^{-1}$ |
| 27 | 98.90 | 0.08 | 0.02 | 0.5 | 0 | 0 | 0.5 | 20 × 10$^{-1}$ |

TABLE 22D

| Test No. | Composition in percent ||||||| Resistivity, ohm-cm |
|---|---|---|---|---|---|---|---|---|
| | First ingredient | Second ingredients || Third ingredient | Fourth ingredients ||| |
| | SrTiO$_3$ | Nb$_2$O$_5$ | CeO | CuO | GeO$_2$ | PbO | ZnO | |
| 28 | 98.90 | 0.02 | 0.08 | 0.5 | 0.5 | 0 | 0 | 14 × 10$^{-1}$ |
| 29 | 98.90 | 0.05 | 0.05 | 0.5 | 0.5 | 0 | 0 | 19 × 10$^{-1}$ |
| 30 | 98.90 | 0.08 | 0.02 | 0.5 | 0.5 | 0 | 0 | 11 × 10$^{-1}$ |
| 31 | 98.90 | 0.02 | 0.08 | 0.5 | 0 | 0.5 | 0 | 23 × 10$^{-1}$ |
| 32 | 98.90 | 0.05 | 0.05 | 0.5 | 0 | 0.5 | 0 | 21 × 10$^{-1}$ |
| 33 | 98.90 | 0.08 | 0.02 | 0.5 | 0 | 0.5 | 0 | 13 × 10$^{-1}$ |
| 34 | 98.90 | 0.02 | 0.08 | 0.5 | 0 | 0 | 0.5 | 16 × 10$^{-1}$ |
| 35 | 98.90 | 0.05 | 0.05 | 0.5 | 0 | 0 | 0.5 | 29 × 10$^{-1}$ |
| 36 | 98.90 | 0.08 | 0.02 | 0.5 | 0 | 0 | 0.5 | 21 × 10$^{-1}$ |

TABLE 22E

| Test No. | Composition in percent ||||||| Resistivity, ohm-cm |
|---|---|---|---|---|---|---|---|---|
| | First ingredient | Second ingredients || Third ingredient | Fourth ingredients ||| |
| | SrTiO$_3$ | Nb$_2$O$_5$ | Dy$_2$O$_3$ | CuO | GeO$_2$ | PbO | ZnO | |
| 37 | 98.90 | 0.02 | 0.08 | 0.5 | 0.5 | 0 | 0 | 8 × 10$^{-1}$ |
| 38 | 98.90 | 0.05 | 0.05 | 0.5 | 0.5 | 0 | 0 | 11 × 10$^{-1}$ |
| 39 | 98.90 | 0.08 | 0.02 | 0.5 | 0.5 | 0 | 0 | 10 × 10$^{-1}$ |
| 40 | 98.90 | 0.02 | 0.08 | 0.5 | 0 | 0.5 | 0 | 7 × 10$^{-1}$ |
| 41 | 98.90 | 0.05 | 0.05 | 0.5 | 0 | 0.5 | 0 | 9 × 10$^{-1}$ |
| 42 | 98.90 | 0.08 | 0.02 | 0.5 | 0 | 0.5 | 0 | 6 × 10$^{-1}$ |
| 43 | 98.90 | 0.02 | 0.08 | 0.5 | 0 | 0 | 0.5 | 6 × 10$^{-1}$ |
| 44 | 98.90 | 0.05 | 0.05 | 0.5 | 0 | 0 | 0.5 | 13 × 10$^{-1}$ |
| 45 | 98.90 | 0.08 | 0.02 | 0.5 | 0 | 0 | 0.5 | 9 × 10$^{-1}$ |

TABLE 22F

| Test No. | Composition in percent ||||||| Resistivity, ohm-cm |
|---|---|---|---|---|---|---|---|---|
| | First ingredient | Second ingredients || Third ingredient | Fourth ingredients ||| |
| | SrTiO$_3$ | La$_2$O$_3$ | Ta$_2$O$_5$ | CuO | GeO$_2$ | ZnO | B$_2$O$_3$ | |
| 46 | 98.90 | 0.02 | 0.08 | 0.5 | 0.5 | 0 | 0 | 11 × 10$^{-1}$ |
| 47 | 98.90 | 0.05 | 0.05 | 0.5 | 0.5 | 0 | 0 | 13 × 10$^{-1}$ |
| 48 | 98.90 | 0.08 | 0.02 | 0.5 | 0.5 | 0 | 0 | 15 × 10$^{-1}$ |
| 49 | 98.90 | 0.02 | 0.08 | 0.5 | 0 | 0.5 | 0 | 13 × 10$^{-1}$ |
| 50 | 98.90 | 0.05 | 0.05 | 0.5 | 0 | 0.5 | 0 | 16 × 10$^{-1}$ |

TABLE 22F-continued

| | Composition in percent | | | | | | | |
|---|---|---|---|---|---|---|---|---|
| | First ingredient | Second ingredients | | Third ingredient | Fourth ingredients | | | Resistivity, |
| Test No. | $SrTiO_3$ | $La_2O_3$ | $Ta_2O_5$ | CuO | $GeO_2$ | ZnO | $B_2O_3$ | ohm-cm |
| 51 | 98.90 | 0.08 | 0.02 | 0.5 | 0 | 0.5 | 0 | $17 \times 10^{-1}$ |
| 52 | 98.90 | 0.02 | 0.08 | 0.5 | 0 | 0 | 0.5 | $13 \times 10^{-1}$ |
| 53 | 98.90 | 0.05 | 0.05 | 0.5 | 0 | 0 | 0.5 | $14 \times 10^{-1}$ |
| 54 | 98.90 | 0.08 | 0.02 | 0.5 | 0 | 0 | 0.5 | $16 \times 10^{-1}$ |

TABLE 22G

| | Composition in percent | | | | | | | Resistivity, |
|---|---|---|---|---|---|---|---|---|
| | First ingredient | Second ingredients | | Third ingredient | Fourth ingredients | | | |
| Test No. | $SrTiO_3$ | $La_2O_3$ | $WO_3$ | CuO | $GeO_2$ | ZnO | $B_2O_3$ | ohm-cm |
| 55 | 98.90 | 0.02 | 0.08 | 0.5 | 0.5 | 0 | 0 | $12 \times 10^{-1}$ |
| 56 | 98.90 | 0.05 | 0.05 | 0.5 | 0.5 | 0 | 0 | $16 \times 10^{-1}$ |
| 57 | 98.90 | 0.08 | 0.02 | 0.5 | 0.5 | 0 | 0 | $21 \times 10^{-1}$ |
| 58 | 98.90 | 0.02 | 0.08 | 0.5 | 0 | 0.5 | 0 | $23 \times 10^{-1}$ |
| 59 | 98.90 | 0.05 | 0.05 | 0.5 | 0 | 0.5 | 0 | $24 \times 10^{-1}$ |
| 60 | 98.90 | 0.08 | 0.02 | 0.5 | 0 | 0.5 | 0 | $23 \times 10^{-1}$ |
| 61 | 98.90 | 0.02 | 0.08 | 0.5 | 0 | 0 | 0.5 | $29 \times 10^{-1}$ |
| 62 | 98.90 | 0.05 | 0.05 | 0.5 | 0 | 0 | 0.5 | $31 \times 10^{-1}$ |
| 63 | 98.90 | 0.08 | 0.02 | 0.5 | 0 | 0 | 0.5 | $30 \times 10^{-1}$ |

TABLE 22H

| | Composition in percent | | | | | | | |
|---|---|---|---|---|---|---|---|---|
| | First ingredient | Second ingredients | | Third ingredient | Fourth ingredients | | | Resistivity, |
| Test No. | $SrTiO_3$ | $La_2O_3$ | $CeO_2$ | CuO | $GeO_2$ | ZnO | $B_2O_3$ | ohm-cm |
| 64 | 98.90 | 0.02 | 0.08 | 0.5 | 0.5 | 0 | 0 | $26 \times 10^{-1}$ |
| 65 | 98.90 | 0.05 | 0.05 | 0.5 | 0.5 | 0 | 0 | $23 \times 10^{-1}$ |
| 66 | 98.90 | 0.08 | 0.02 | 0.5 | 0.5 | 0 | 0 | $25 \times 10^{-1}$ |
| 67 | 98.90 | 0.02 | 0.08 | 0.5 | 0 | 0.5 | 0 | $31 \times 10^{-1}$ |
| 68 | 98.90 | 0.05 | 0.05 | 0.5 | 0 | 0.5 | 0 | $30 \times 10^{-1}$ |
| 69 | 98.90 | 0.08 | 0.02 | 0.5 | 0 | 0.5 | 0 | $29 \times 10^{-1}$ |
| 70 | 98.90 | 0.02 | 0.08 | 0.5 | 0 | 0 | 0.5 | $29 \times 10^{-1}$ |
| 71 | 98.90 | 0.05 | 0.05 | 0.5 | 0 | 0 | 0.5 | $36 \times 10^{-1}$ |
| 72 | 98.90 | 0.08 | 0.02 | 0.5 | 0 | 0 | 0.5 | $35 \times 10^{-1}$ |

TABLE 22I

| | Composition in percent | | | | | | | |
|---|---|---|---|---|---|---|---|---|
| | First ingredient | Second ingredients | | Third ingredient | Fourth ingredients | | | Resistivity, |
| Test No. | $SrTiO_3$ | $La_2O_3$ | $Nd_2O_3$ | CuO | $GeO_2$ | ZnO | $B_2O_3$ | ohm-cm |
| 73 | 98.90 | 0.02 | 0.08 | 0.5 | 0.5 | 0 | 0 | $21 \times 10^{-1}$ |
| 74 | 98.90 | 0.05 | 0.05 | 0.5 | 0.5 | 0 | 0 | $20 \times 10^{-1}$ |
| 75 | 98.90 | 0.08 | 0.02 | 0.5 | 0.5 | 0 | 0 | $18 \times 10^{-1}$ |
| 76 | 98.90 | 0.02 | 0.08 | 0.5 | 0 | 0.5 | 0 | $17 \times 10^{-1}$ |
| 77 | 98.90 | 0.05 | 0.05 | 0.5 | 0 | 0.5 | 0 | $19 \times 10^{-1}$ |
| 78 | 98.90 | 0.08 | 0.02 | 0.5 | 0 | 0.5 | 0 | $13 \times 10^{-1}$ |
| 79 | 98.90 | 0.02 | 0.08 | 0.5 | 0 | 0 | 0.5 | $22 \times 10^{-1}$ |
| 80 | 98.90 | 0.05 | 0.05 | 0.5 | 0 | 0 | 0.5 | $21 \times 10^{-1}$ |
| 81 | 98.90 | 0.08 | 0.02 | 0.5 | 0 | 0 | 0.5 | $19 \times 10^{-1}$ |

TABLE 22J

| | Composition in percent | | | | | | | |
|---|---|---|---|---|---|---|---|---|
| | First ingredient | Second ingredients | | Third ingredient | Fourth ingredients | | | Resistivity, |
| Test No. | $SrTiO_3$ | $La_2O_3$ | $Sm_2O_3$ | CuO | $GeO_2$ | ZnO | $B_2O_3$ | ohm-cm |
| 82 | 98.90 | 0.02 | 0.08 | 0.5 | 0.5 | 0 | 0 | $29 \times 10^{-1}$ |
| 83 | 98.90 | 0.05 | 0.05 | 0.5 | 0.5 | 0 | 0 | $30 \times 10^{-1}$ |
| 84 | 98.90 | 0.08 | 0.02 | 0.5 | 0.5 | 0 | 0 | $33 \times 10^{-1}$ |
| 85 | 98.90 | 0.02 | 0.08 | 0.5 | 0 | 0.5 | 0 | $28 \times 10^{-1}$ |
| 86 | 98.90 | 0.05 | 0.05 | 0.5 | 0 | 0.5 | 0 | $32 \times 10^{-1}$ |
| 87 | 98.90 | 0.08 | 0.02 | 0.5 | 0 | 0.5 | 0 | $35 \times 10^{-1}$ |
| 88 | 89.90 | 0.02 | 0.08 | 0.5 | 0 | 0 | 0.5 | $34 \times 10^{-1}$ |
| 89 | 89.90 | 0.05 | 0.05 | 0.5 | 0 | 0 | 0.5 | $36 \times 10^{-1}$ |

TABLE 22J-continued

| Test No. | First ingredient SrTiO3 | Second ingredients La2O3 | Second ingredients Sm2O3 | Third ingredient CuO | Fourth ingredients GeO2 | Fourth ingredients ZnO | Fourth ingredients B2O3 | Resistivity, ohm-cm |
|---|---|---|---|---|---|---|---|---|
| 90 | 89.90 | 0.08 | 0.02 | 0.5 | 0 | 0 | 0.5 | $39 \times 10^{-1}$ |

TABLE 22K

| Test No. | First ingredient SrTiO3 | Second ingredients Nb2O5 | Second ingredients WO3 | Second ingredients La2O3 | Third ingredients CuO | Third ingredients Cu2O | Fourth ingredient GeO2 | Resistivity, ohm-cm |
|---|---|---|---|---|---|---|---|---|
| 91 | 98.90 | 0.1 | 0 | 0 | 0.1 | 0.4 | 0.5 | $9 \times 10^{-1}$ |
| 92 | 98.90 | 0.1 | 0 | 0 | 0.25 | 0.25 | 0.5 | $12 \times 10^{-1}$ |
| 93 | 98.90 | 0.1 | 0 | 0 | 0.4 | 0.1 | 0.5 | $6 \times 10^{-1}$ |
| 94 | 98.90 | 0 | 0.1 | 0 | 0.1 | 0.4 | 0.5 | $11 \times 10^{-1}$ |
| 95 | 98.90 | 0 | 0.1 | 0 | 0.25 | 0.25 | 0.5 | $13 \times 10^{-1}$ |
| 96 | 98.90 | 0 | 0.1 | 0 | 0.4 | 0.1 | 0.5 | $8 \times 10^{-1}$ |
| 97 | 98.90 | 0 | 0 | 0.1 | 0.1 | 0.4 | 0.5 | $9 \times 10^{-1}$ |
| 98 | 98.90 | 0 | 0 | 0.1 | 0.25 | 0.25 | 0.5 | $9 \times 10^{-1}$ |
| 99 | 98.90 | 0 | 0 | 0.1 | 0.4 | 0.1 | 0.5 | $7 \times 10^{-1}$ |

TABLE 22L

| Test No. | First ingredient SrTiO3 | Second ingredients Nb2O5 | Second ingredients WO3 | Second ingredients La2O3 | Third ingredients CuO | Third ingredients MoO3 | Fourth ingredient GeO2 | Resistivity, ohm-cm |
|---|---|---|---|---|---|---|---|---|
| 100 | 98.90 | 0.1 | 0 | 0 | 0.1 | 0.4 | 0.5 | $6 \times 10^{-1}$ |
| 101 | 98.90 | 0.1 | 0 | 0 | 0.25 | 0.25 | 0.5 | $7 \times 10^{-1}$ |
| 102 | 98.90 | 0.1 | 0 | 0 | 0.4 | 0.1 | 0.5 | $5 \times 10^{-1}$ |
| 103 | 98.90 | 0 | 0.1 | 0 | 0.1 | 0.4 | 0.5 | $7 \times 10^{-1}$ |
| 104 | 98.90 | 0 | 0.1 | 0 | 0.25 | 0.25 | 0.5 | $6 \times 10^{-1}$ |
| 105 | 98.90 | 0 | 0.1 | 0 | 0.4 | 0.1 | 0.5 | $7 \times 10^{-1}$ |
| 106 | 98.90 | 0 | 0 | 0.1 | 0.1 | 0.4 | 0.5 | $6 \times 10^{-1}$ |
| 107 | 98.90 | 0 | 0 | 0.1 | 0.25 | 0.25 | 0.5 | $8 \times 10^{-1}$ |
| 108 | 98.90 | 0 | 0 | 0.1 | 0.4 | 0.1 | 0.5 | $11 \times 10^{-1}$ |

TABLE 22M

| Test No. | First ingredient SrTiO3 | Second ingredients Nb2O5 | Second ingredients WO3 | Second ingredients La2O3 | Third ingredients MoO3 | Third ingredients V2O5 | Fourth ingredient GeO2 | Resistivity, ohm-cm |
|---|---|---|---|---|---|---|---|---|
| 109 | 98.90 | 0.1 | 0 | 0 | 0.1 | 0.4 | 0.5 | $11 \times 10^{-1}$ |
| 110 | 98.90 | 0.1 | 0 | 0 | 0.25 | 0.25 | 0.5 | $13 \times 10^{-1}$ |
| 111 | 98.90 | 0.1 | 0 | 0 | 0.4 | 0.1 | 0.5 | $14 \times 10^{-1}$ |
| 112 | 98.90 | 0 | 0.1 | 0 | 0.1 | 0.4 | 0.5 | $15 \times 10^{-1}$ |
| 113 | 98.90 | 0 | 0.1 | 0 | 0.25 | 0.25 | 0.5 | $10 \times 10^{-1}$ |
| 114 | 98.90 | 0 | 0.1 | 0 | 0.4 | 0.1 | 0.5 | $11 \times 10^{-1}$ |
| 115 | 98.90 | 0 | 0 | 0.1 | 0.1 | 0.4 | 0.5 | $17 \times 10^{-1}$ |
| 116 | 98.90 | 0 | 0 | 0.1 | 0.25 | 0.25 | 0.5 | $14 \times 10^{-1}$ |
| 117 | 98.90 | 0 | 0 | 0.1 | 0.4 | 0.1 | 0.5 | $15 \times 10^{-1}$ |

TABLE 22N

| Test No. | First ingredient SrTiO3 | Second ingredients Nb2O5 | Second ingredients WO3 | Second ingredients La2O3 | Third ingredients V2O5 | Third ingredients CrO3 | Fourth ingredient GeO2 | Resistivity, ohm-cm |
|---|---|---|---|---|---|---|---|---|
| 118 | 98.90 | 0.1 | 0 | 0 | 0.1 | 0.4 | 0.5 | $7 \times 10^{-1}$ |
| 119 | 98.90 | 0.1 | 0 | 0 | 0.25 | 0.25 | 0.5 | $9 \times 10^{-1}$ |
| 120 | 98.90 | 0.1 | 0 | 0 | 0.4 | 0.1 | 0.5 | $8 \times 10^{-1}$ |
| 121 | 98.90 | 0 | 0.1 | 0 | 0.1 | 0.4 | 0.5 | $3 \times 10^{-1}$ |
| 122 | 98.90 | 0 | 0.1 | 0 | 0.25 | 0.25 | 0.5 | $6 \times 10^{-1}$ |
| 123 | 98.90 | 0 | 0.1 | 0 | 0.4 | 0.1 | 0.5 | $9 \times 10^{-1}$ |
| 124 | 98.90 | 0 | 0 | 0.1 | 0.1 | 0.4 | 0.5 | $8 \times 10^{-1}$ |
| 125 | 98.90 | 0 | 0 | 0.1 | 0.25 | 0.25 | 0.5 | $9 \times 10^{-1}$ |
| 126 | 98.90 | 0 | 0 | 0.1 | 0.4 | 0.1 | 0.5 | $9 \times 10^{-1}$ |

TABLE 22-O

| Test No. | Composition in percent | | | | | | | Resistivity ohm-cm |
|---|---|---|---|---|---|---|---|---|
| | First ingredient | Second ingredients | | | Third ingredients | | Fourth ingredient | |
| | $SrTiO_3$ | $Nb_2O_5$ | $WO_3$ | $La_2O_3$ | $CrO_3$ | $Cu_2O$ | $GeO_2$ | |
| 127 | 98.90 | 0.1 | 0 | 0 | 0.1 | 0.4 | 0.5 | $10 \times 10^{-1}$ |
| 128 | 98.90 | 0.1 | 0 | 0 | 0.25 | 0.25 | 0.5 | $9 \times 10^{-1}$ |
| 129 | 98.90 | 0.1 | 0 | 0 | 0.4 | 0.1 | 0.5 | $7 \times 10^{-1}$ |
| 130 | 98.90 | 0 | 0.1 | 0 | 0.1 | 0.4 | 0.5 | $11 \times 10^{-1}$ |
| 131 | 98.90 | 0 | 0.1 | 0 | 0.25 | 0.25 | 0.5 | $12 \times 10^{-1}$ |
| 132 | 98.90 | 0 | 0.1 | 0 | 0.4 | 0.1 | 0.5 | $11 \times 10^{-1}$ |
| 133 | 98.90 | 0 | 0 | 0.1 | 0.1 | 0.4 | 0.5 | $13 \times 10^{-1}$ |
| 134 | 98.90 | 0 | 0 | 0.1 | 0.25 | 0.25 | 0.5 | $11 \times 10^{-1}$ |
| 135 | 98.90 | 0 | 0 | 0.1 | 0.4 | 0.1 | 0.5 | $9 \times 10^{-1}$ |

EXAMPLE 23

Six different combinations of four ingredients chosen in accordance with the invention, each in a fixed set of proportions, were prepared as in TABLES 23A through 23F, in order to to study the relationship between the temperatures of the oxidative heat treatment and the characteristics of the resulting ceramic bodies and varistors. The tabulated combinations of ingredients were processed into ceramic discs, and further into varistors, through the same procedure as in EXAMPLE 1 except that the temperature of the oxidative heat treatment was set at various values from 700° to 1170° C. TABLES 23A through 23F also represent the $E_{10}$, $\alpha$, and resistivity of the thus-fabricated ceramic bodies and varistors. The $E_{10}$ of the varistors oxidatively heat-treated at 700° and 800° C. was not measured.

TABLE 23A

| Test No. | Composition in percent | | | | Temperature of oxidative heat treatment, °C. | Properties | | |
|---|---|---|---|---|---|---|---|---|
| | $SrTiO_3$ | $Nb_2O_5$ | $CuO$ | $GeO_2$ | | $E_{10}$, V | $\alpha$ | Resistivity, ohm-cm |
| 1 | 98.9 | 0.1 | 0.5 | 0.5 | 700 | ... | 1 | $6 \times 10^{-1}$ |
| 2 | 98.9 | 0.1 | 0.5 | 0.5 | 800 | ... | 1 | 2 |
| 3 | 98.9 | 0.1 | 0.5 | 0.5 | 900 | 4 | 4 | $4 \times 10^2$ |
| 4 | 98.9 | 0.1 | 0.5 | 0.5 | 1000 | 14 | 6 | $1 \times 10^3$ |
| 5 | 98.9 | 0.1 | 0.5 | 0.5 | 1100 | 36 | 17 | $4 \times 10^3$ |
| 6 | 98.9 | 0.1 | 0.5 | 0.5 | 1170 | 68 | 26 | $7 \times 10^3$ |

TABLE 23B

| Test No. | Composition in percent | | | | Temperature of oxidative heat treatment, °C. | Properties | | |
|---|---|---|---|---|---|---|---|---|
| | $SrTiO_3$ | $Nb_2O_5$ | $Cu_2O$ | $GeO_2$ | | $E_{10}$, V | $\alpha$ | Resistivity ohm-cm |
| 7 | 98.9 | 0.1 | 0.5 | 0.5 | 700 | ... | 1 | $7 \times 10^{-1}$ |
| 8 | 98.9 | 0.1 | 0.5 | 0.5 | 800 | ... | 1 | 5 |
| 9 | 98.9 | 0.1 | 0.5 | 0.5 | 900 | 4 | 4 | $3 \times 10^2$ |
| 10 | 98.9 | 0.1 | 0.5 | 0.5 | 1000 | 17 | 8 | $2 \times 10^3$ |
| 11 | 98.9 | 0.1 | 0.5 | 0.5 | 1100 | 44 | 21 | $4 \times 10^3$ |
| 12 | 98.9 | 0.1 | 0.5 | 0.5 | 1170 | 99 | 35 | $1 \times 10^4$ |

TABLE 23C

| Test No. | Composition in percent | | | | Temperature of oxidative heat treatment, °C. | Properties | | |
|---|---|---|---|---|---|---|---|---|
| | $SrTiO_3$ | $Nb_2O_5$ | $V_2O_5$ | $GeO_2$ | | $E_{10}$, V | $\alpha$ | Resistivity, ohm-cm |
| 13 | 98.9 | 0.1 | 0.5 | 0.5 | 700 | ... | 1 | $9 \times 10^{-1}$ |
| 14 | 98.9 | 0.1 | 0.5 | 0.5 | 800 | ... | 1 | 6 |
| 15 | 98.9 | 0.1 | 0.5 | 0.5 | 900 | 5 | 4 | $4 \times 10^2$ |
| 16 | 98.9 | 0.1 | 0.5 | 0.5 | 1000 | 14 | 6 | $2 \times 10^3$ |
| 17 | 98.9 | 0.1 | 0.5 | 0.5 | 1100 | 35 | 16 | $3 \times 10^3$ |
| 18 | 98.9 | 0.1 | 0.5 | 0.5 | 1170 | 67 | 29 | $7 \times 10^3$ |

TABLE 23D

| Test No. | Composition in percent | | | | Temperature of oxidative heat treatment, °C. | Properties | | |
|---|---|---|---|---|---|---|---|---|
| | $SrTiO_3$ | $Nb_2O_5$ | $CrO_3$ | $GeO_2$ | | $E_{10}$, V | $\alpha$ | Resistivity, ohm-cm |
| 19 | 98.9 | 0.1 | 0.5 | 0.5 | 700 | ... | 1 | $8 \times 10^{-1}$ |
| 20 | 98.9 | 0.1 | 0.5 | 0.5 | 800 | ... | 1 | 5 |
| 21 | 98.9 | 0.1 | 0.5 | 0.5 | 900 | 6 | 4 | $5 \times 10^2$ |
| 22 | 98.9 | 0.1 | 0.5 | 0.5 | 1000 | 15 | 7 | $2 \times 10^3$ |
| 23 | 98.9 | 0.1 | 0.5 | 0.5 | 1100 | 40 | 20 | $4 \times 10^3$ |
| 24 | 98.9 | 0.1 | 0.5 | 0.5 | 1170 | 82 | 33 | $8 \times 10^3$ |

TABLE 23E

| Test No. | Composition in percent | | | | Temperature of oxidative heat treatment, °C. | Properties | | |
|---|---|---|---|---|---|---|---|---|
| | $SrTiO_3$ | $Nb_2O_5$ | $MoO_3$ | $GeO_2$ | | $E_{10}$, V | $\alpha$ | Resistivity, ohm-cm |
| 25 | 98.9 | 0.1 | 0.5 | 0.5 | 700 | ... | 1 | $6 \times 10^{-1}$ |
| 26 | 98.9 | 0.1 | 0.5 | 0.5 | 800 | ... | 1 | 3 |
| 27 | 98.9 | 0.1 | 0.5 | 0.5 | 900 | 3 | 4 | $5 \times 10^2$ |
| 28 | 98.9 | 0.1 | 0.5 | 0.5 | 1000 | 13 | 6 | $1 \times 10^3$ |
| 29 | 98.9 | 0.1 | 0.5 | 0.5 | 1100 | 41 | 21 | $4 \times 10^3$ |
| 30 | 98.9 | 0.1 | 0.5 | 0.5 | 1170 | 82 | 31 | $9 \times 10^3$ |

TABLE 23F

| Test No. | Composition in percent | | | | Temperature of oxidative heat treatment, °C. | Properties | | |
|---|---|---|---|---|---|---|---|---|
| | $SrTiO_3$ | $Nb_2O_5$ | $MnO_2$ | $GeO_2$ | | $E_{10}$, V | $\alpha$ | Resistivity, ohm-cm |
| 31 | 98.9 | 0.1 | 0.5 | 0.5 | 700 | ... | 1 | $8 \times 10^{-1}$ |
| 32 | 98.9 | 0.1 | 0.5 | 0.5 | 800 | ... | 2 | 3 |
| 33 | 98.9 | 0.1 | 0.5 | 0.5 | 900 | 4 | 4 | $4 \times 10^2$ |
| 34 | 98.9 | 0.1 | 0.5 | 0.5 | 1000 | 14 | 6 | $2 \times 10^3$ |
| 35 | 98.9 | 0.1 | 0.5 | 0.5 | 1100 | 39 | 18 | $4 \times 10^3$ |
| 36 | 98.9 | 0.1 | 0.5 | 0.5 | 1170 | 89 | 31 | $8 \times 10^4$ |

Figure 7:
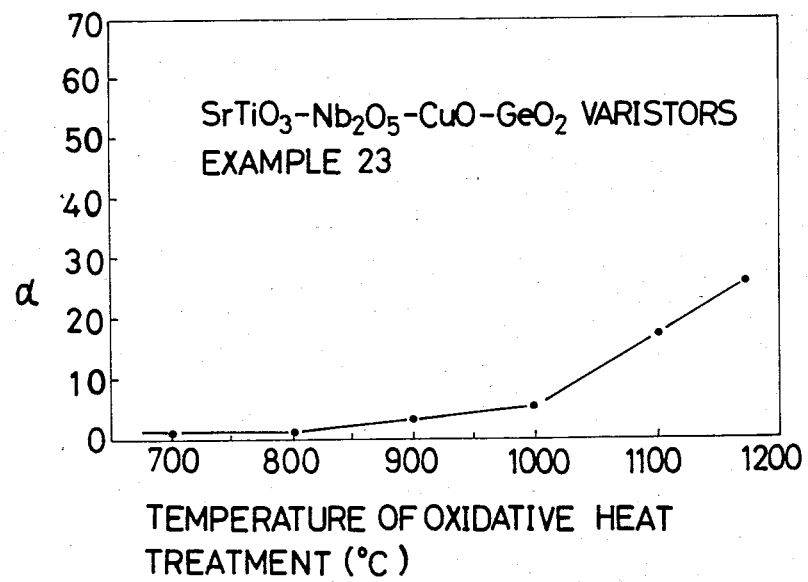
FIG. 7 is a graph plotting the curve of the $\alpha$ of $SrTiO_3$-$Nb_2O_5$-CuO-$GeO_2$ varistors against the temperatures at which they were subjected to oxidative heat treatment in manufacture, as tested in EXAMPLE 23 of the invention.

Based on the data given in TABLE 23A, FIG. 7 graphically represents the curve of the $\alpha$ of the $SrTiO_3$-$Nb_2O_5$-$CuO$-$GeO_2$ varistors against the temperature of the oxidative heat treatment. The graph exhibits some proportionality between the two factors, making clear that the $\alpha$ of the varistors can be controlled by the temperature of the oxidative heat treatment during the fabrication of the ceramic bodies. A comparison of this graph with that of FIG. 6, which plots a similar curve in the case where the ceramic composition contains no fourth ingredient, will reveal that the $\alpha$ of the varistors including the fourth ingredient varies less with the temperature and so is easier to control.

Figure 8:
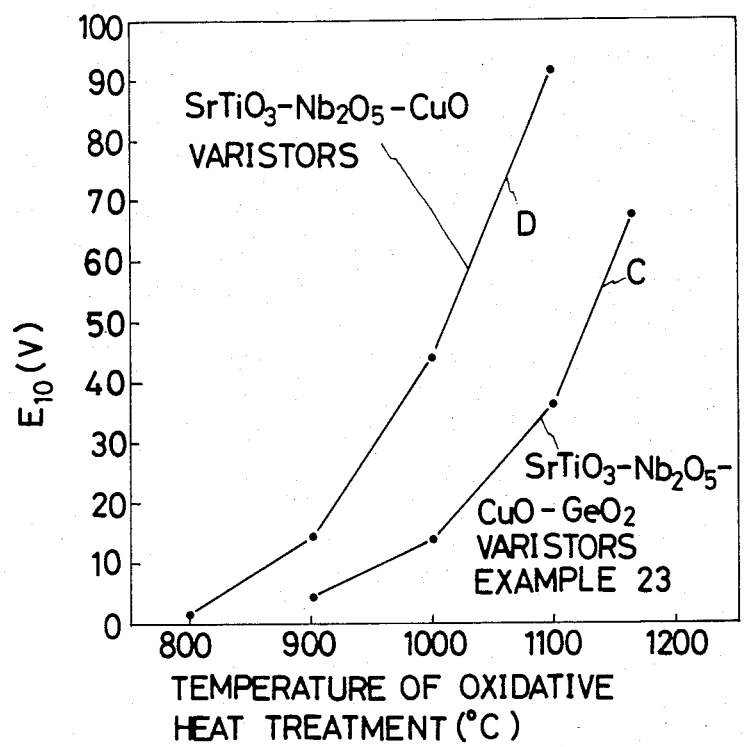
FIG. 8 is a graph plotting the curve of the $E_{10}$ of the $SrTiO_3$-$Nb_2O_5$-CuO-$GeO_2$ varistors against the temperatures at which they were subjected to oxidative heat treatment in manufacture, in comparison with the curve representing similar relationship in the case of the $SrTiO_3$-$Nb_2O_5$-CuO varistors, also as tested in EXAMPLE 23 of the invention.

The curve C in the graph of FIG. 8 represents the $E_{10}$ of the $SrTiO_3$-$Nb_2O_5$-$CuO$-$GeO_2$ varistors plotted against the temperature of the oxidative heat treatment, on the basis of the data also given in TABLE 23A. The curve indicates that the $E_{10}$ of the varistors can likewise be controlled by the temperature of the oxidative heat treatment.

By way of comparison several ceramic bodies were prepared from 99.4% $SrTiO_3$, 0.1% $Nb_2O_5$, and 0.5% $CuO$, with no fourth ingredient added, by progressively varying the temperature of the oxidative heat treatment. The curve D in FIG. 8 represents the $E_{10}$ of the varistors made from these ceramic bodies, plotted against the temperature of the oxidative heat treatment. As will be understood upon comparison of the curves C and D, the addition of the fourth ingredient makes less the change of $E_{10}$ with temperature. When 10 $SrTiO_3$-$Nb_2O_5$-$CuO$ varistors were produced, with the temperature of the oxidative heat treatment set at 1000° C., their $E_{10}$ varied between 33 and 53 V, averaging 44 V. There was thus a difference of as much as 20 V between the maximum and minimum values. Contrastively, when another ten varistors were prepared by adding $GeO_2$ as the fourth ingredient to the above composition, with the temperature of the oxidative heat treatment also set at 1000° C., their $E_{10}$ varied only between 12 and 16 V, averaging 14 V. Thus the addition of the fourth ingredient greatly reduces fluctuations in $E_{10}$. Such reduction of fluctuations in $E_{10}$ and $\alpha$ results, obviously, from the higher coherency of the ceramic bodies and greater uniformity of particle size, brought about by the introduction of the fourth ingredient.

When the temperature of the oxidative heat treatment was below 900° C., the resistivity of the ceramic bodies became too low, and when the temperature was above 1300° C., the resistivity became too high for varistors. The oxidative heat treatment should therefore be conducted in a temperature range of about 900°–1300° C., preferably about 900°–117° C.

EXAMPLE 24

Varistors incorporating a fourth ingredient were tested as to their pulse-withstanding abilities in this EXAMPLE. Ceramic discs were prepared from six different combinations of four possible ingredients given in TABLE 24, in like proportions, and were processed into varistors, through the same procedure as in EXAMPLE 1 except that the temperature of the oxidative heat treatment was 1000° C. As in EXAMPLE 14, 10 voltage pulses of 100 V were successively applied to each varistor, and a rate of change in $E_{10}$ before and after the pulse application was computed. TABLE 24 shows the results.

TABLE 24

| Test No. | Composition | | | | Change in $E_{10}$, % |
|---|---|---|---|---|---|
| | First ingredient (98.9%) | Second ingredient (0.1%) | Third ingredient (0.5%) | Fourth ingredient (0.5%) | |
| 1 | $SrTiO_3$ | $Nb_2O_5$ | $V_2O_5$ | $GeO_2$ | −0.05 |
| 2 | $SrTiO_3$ | $Nb_2O_5$ | $CrO_3$ | $GeO_2$ | −0.03 |
| 3 | $SrTiO_3$ | $Nb_2O_5$ | $CuO$ | $GeO_2$ | −0.01 |
| 4 | $SrTiO_3$ | $Nb_2O_5$ | $Cu_2O$ | $GeO_2$ | −0.03 |
| 5 | $SrTiO_3$ | $Nb_2O_5$ | $MoO_3$ | $GeO_2$ | −0.06 |
| 6 | $SrTiO_3$ | $Nb_2O_5$ | $MnO_2$ | $GeO_2$ | −0.05 |

EXAMPLE 25

Six different combinations of four possible ingredients in accordance with the invention, each in different sets of proportions, were prepared as in TABLES 25A through 25F. The various combinations of ingredients were processed into ceramic discs, and further into varistors, through the same procedure as in EXAMPLE 1 except that the temperature of the oxidative heat treatment was 1000° C. In order to In order to examine variations in the $E_{10}$ of the varistors with temperatures at which they are put to use, the temperature change $Tc_{25-50}$ of the $E_{10}$ of each varistor was computed from the equation, $Tc_{25-50}=(A-B)100/A$, where A is the value of $E_{10}$ at 25° C., and B is the value of $E_{10}$ at 50° C. TABLES 25A through 25F show the results.

TABLE 25A

| Test No. | Composition in percent | | | | Temperature change $Tc_{25-50}$ of $E_{10}$, % |
|---|---|---|---|---|---|
| | SrTiO$_3$ | Nb$_2$O$_5$ | CuO | GeO$_2$ | |
| 1 | 99.48 | 0.01 | 0.01 | 0.5 | −0.07 |
| 2 | 98.99 | 0.01 | 0.50 | 0.5 | −0.07 |
| 3 | 94.49 | 0.01 | 5.00 | 0.5 | −0.06 |
| 4 | 99.39 | 0.10 | 0.01 | 0.5 | −0.06 |
| 5 | 98.90 | 0.10 | 0.50 | 0.5 | −0.05 |
| 6 | 94.40 | 0.10 | 5.00 | 0.5 | −0.05 |
| 7 | 96.99 | 2.5 | 0.01 | 0.5 | −0.06 |
| 8 | 96.50 | 2.5 | 0.50 | 0.5 | −0.05 |
| 9 | 92.00 | 2.5 | 5.00 | 0.5 | −0.05 |

TABLE 25B

| Test No. | Composition in percent | | | | Temperature change $Tc_{25-50}$ of $E_{10}$, % |
|---|---|---|---|---|---|
| | SrTiO$_3$ | Nb$_2$O$_5$ | Cu$_2$O | GeO$_2$ | |
| 10 | 99.48 | 0.01 | 0.01 | 0.5 | −0.07 |
| 11 | 98.99 | 0.01 | 0.50 | 0.5 | −0.06 |
| 12 | 96.99 | 0.01 | 2.50 | 0.5 | −0.05 |
| 13 | 99.39 | 0.10 | 0.01 | 0.5 | −0.06 |
| 14 | 98.90 | 0.10 | 0.50 | 0.5 | −0.06 |
| 15 | 96.90 | 0.10 | 2.50 | 0.5 | −0.05 |
| 16 | 96.99 | 2.5 | 0.01 | 0.5 | −0.06 |
| 17 | 96.50 | 2.5 | 0.50 | 0.5 | −0.05 |
| 18 | 94.50 | 2.5 | 2.50 | 0.5 | −0.05 |

TABLE 25C

| Test No. | Composition in percent | | | | Temperature change $Tc_{25-50}$ of $E_{10}$, % |
|---|---|---|---|---|---|
| | SrTiO$_3$ | Nb$_2$O$_5$ | V$_2$O$_5$ | GeO$_2$ | |
| 19 | 99.48 | 0.01 | 0.01 | 0.5 | −0.06 |
| 20 | 98.99 | 0.01 | 0.50 | 0.5 | −0.06 |
| 21 | 98.49 | 0.01 | 1.00 | 0.5 | −0.05 |
| 22 | 99.39 | 0.10 | 0.01 | 0.5 | −0.05 |
| 23 | 98.90 | 0.10 | 0.50 | 0.5 | −0.06 |
| 24 | 98.40 | 0.10 | 1.00 | 0.5 | −0.07 |
| 25 | 96.99 | 2.5 | 0.01 | 0.5 | −0.06 |
| 26 | 96.50 | 2.5 | 0.50 | 0.5 | −0.06 |
| 27 | 96.00 | 2.5 | 1.00 | 0.5 | −0.05 |

TABLE 25D

| Test No. | Composition in percent | | | | Temperature change $Tc_{25-50}$ of $E_{10}$, % |
|---|---|---|---|---|---|
| | SrTiO$_3$ | Nb$_2$O$_5$ | CrO$_3$ | GeO$_2$ | |
| 28 | 99.48 | 0.01 | 0.01 | 0.5 | −0.07 |
| 29 | 98.99 | 0.01 | 0.50 | 0.5 | −0.06 |
| 30 | 97.49 | 0.01 | 2.00 | 0.5 | −0.06 |
| 31 | 99.39 | 0.10 | 0.01 | 0.5 | −0.07 |
| 32 | 98.90 | 0.10 | 0.50 | 0.5 | −0.07 |
| 33 | 97.40 | 0.10 | 2.00 | 0.5 | −0.05 |
| 34 | 96.99 | 2.5 | 0.01 | 0.5 | −0.06 |
| 35 | 96.50 | 2.5 | 0.50 | 0.5 | −0.07 |
| 36 | 95.00 | 2.5 | 2.00 | 0.5 | −0.05 |

TABLE 25E

| Test No. | Composition in percent | | | | Temperature change $Tc_{25-50}$ of $E_{10}$, % |
|---|---|---|---|---|---|
| | SrTiO$_3$ | Nb$_2$O$_5$ | MoO$_3$ | GeO$_2$ | |
| 37 | 99.48 | 0.01 | 0.01 | 0.5 | −0.07 |
| 38 | 98.99 | 0.01 | 0.50 | 0.5 | −0.06 |
| 39 | 94.49 | 0.01 | 5.00 | 0.5 | −0.06 |
| 40 | 99.39 | 0.10 | 0.01 | 0.5 | −0.07 |
| 41 | 98.90 | 0.10 | 0.50 | 0.5 | −0.07 |
| 42 | 94.40 | 0.10 | 5.00 | 0.5 | −0.06 |
| 43 | 96.99 | 2.50 | 0.01 | 0.5 | −0.06 |
| 44 | 96.50 | 2.50 | 0.50 | 0.5 | −0.05 |
| 45 | 92.00 | 2.50 | 5.00 | 0.5 | −0.05 |

TABLE 25F

| Test No. | Composition in percent | | | | Temperature change $Tc_{25-50}$ of $E_{10}$, % |
|---|---|---|---|---|---|
| | SrTiO$_3$ | Nb$_2$O$_5$ | MnO$_2$ | GeO$_2$ | |
| 46 | 99.48 | 0.01 | 0.01 | 0.5 | −0.07 |
| 47 | 98.99 | 0.01 | 0.50 | 0.5 | −0.06 |
| 48 | 96.99 | 0.01 | 2.50 | 0.5 | −0.06 |
| 49 | 99.39 | 0.10 | 0.01 | 0.5 | −0.06 |
| 50 | 98.90 | 0.10 | 0.50 | 0.5 | −0.06 |
| 51 | 96.90 | 0.10 | 2.50 | 0.5 | −0.05 |
| 52 | 96.99 | 2.50 | 0.01 | 0.5 | −0.05 |
| 53 | 96.50 | 2.50 | 0.50 | 0.5 | −0.05 |
| 54 | 94.50 | 2.50 | 2.50 | 0.5 | −0.05 |

The tabulated results all indicate little changes in the $E_{10}$ of the varistors with the temperatures at which they operate. It can be concluded from this that the operating temperatures of the varistors prepared in accordance with the invention hardly affect their performance.

Figure 9:
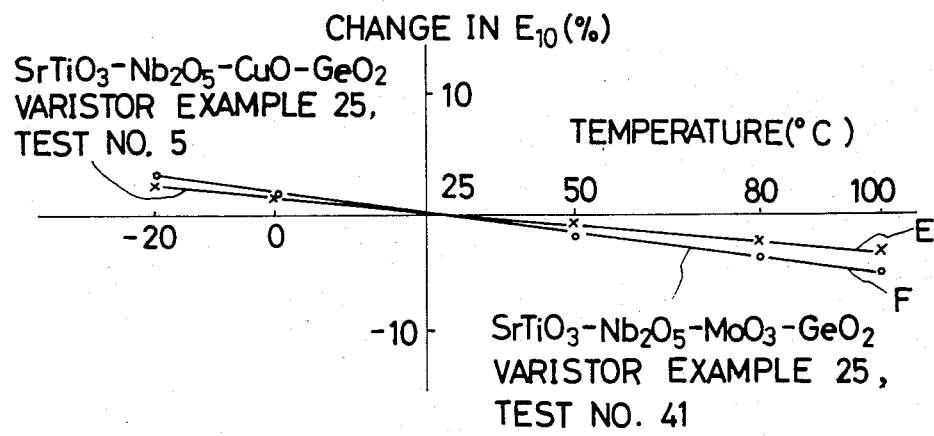
FIG. 9 is a graph plotting the curves of the rates of change in the $E_{10}$ of $SrTiO_3$-$Nb_2O_5$-CuO-$GeO_2$ and $SrTiO_3$-$Nb_2O_5$-$MoO_3$-GeO varistors with the temperatures at which they were put to use, as tested in EXAMPLE 25 of the invention.

By way of example the $E_{10}$ of the varistor of Test No. 5 in TABLE 25A was further measured at temperatures of −20°, 0°, +80° and +100° C. The curve E in the graph of FIG. 9 represents the relation, $(A-C)100/A$, of this varistor, where A is as defined above and C is the value of $E_{10}$ at each of the other temperatures. The curve F in the same graph plots a similar relation of the varistor of Test No. 41 in TABLE 25E. The curves show little changes in the $E_{10}$ of the exemplified varistors over a wide temperature range. Obviously, the same holds true with the other varistors manufactured in accordance with the invention.

It is to be understood that the foregoing EXAMPLES are meant purely to illustrate or explain and not to impose limitations upon the invention. Experiment has proved, for example, that alumina, silica and other additives might be used insofar as they do not impair the desire properties of the ceramic materials in accordance with the invention. It has also been confirmed that the addition of up to 1.5% bismuth trioxide, with a view to the control of particle size, firing temperature, etc., does not adversely affect the desired properties of the ceramic materials. The appended claims should therefore be construed to specify only the fundamental ingredients of the inventive ceramics.

What is claimed is:

1. A semiconductive ceramic composition with a nonlinear volt-ampere characteristic, particularly well suited for varistors, consisting essentially of:
   (a) from about 90.000 to about 99.989% SrTiO$_3$;
   (b) from about 0.001 to about 5.000% of at least one metal oxide, for making the composition semiconductive, selected from the group consisting of Nb$_2$O$_5$, Ta$_2$O$_5$, WO$_3$, La$_2$O$_3$, CeO$_2$, Nd$_2$O$_3$, Pr$_6$O$_{11}$, Dy$_2$O$_3$, Y$_2$O$_3$, and Sm$_2$O$_3$; and
   (c) from about 0.010 to about 5.000% of at least one other metal oxide, for improving the nonlinear volt-ampere characteristic of the composition, selected from the group consisting of V$_2$O$_5$, Cr$_2$O$_3$, CuO, Cu$_2$O, MoO$_3$, and MnO$_2$.

2. A semiconductive ceramic composition with a nonlinear volt-ampere characteristic, particularly well suited for varistors, consisting essentially of:
(a) from about 86.000 to about 99.979% $SrTiO_3$;
(b) from about 0.001 to about 5.000% of at least one metal oxide, for making the composition semiconductive, selected from the group consisting of $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$, and $Sm_2O_3$;
(c) from about 0.010 to about 5.000% of at least one other metal oxide, for improving the nonlinear volt-ampere characteristic of the composition, selected from the group consisting of $V_2O_5$, $Cr_2O_3$, CuO, $Cu_2O$, $MoO_3$, and $MnO_2$; and
(d) from about 0.010 to about 4.000% of at least one still other metal oxide, for improving the coherency of bodies molded from the composition, selected from the group consisting of $GeO_2$, ZnO, $B_2O_3$, and PbO.

* * * * *

UNITED STATES PATENT AND TRADEMARK OFFICE
CERTIFICATE OF CORRECTION

PATENT NO. : 4,519,942
DATED : May 28, 1985
INVENTOR(S) : Nobutatsu Yamaoka et al It is certified that error appears in the above-identified patent and that said Letters Patent is hereby corrected as shown below:

Column 2, line 17, delete "material" and substitute --materials--.

Column 6, line 52, delete "60" and substitute --$\alpha$--.

Signed and Sealed this

Nineteenth Day of November 1985

[SEAL]

Attest:

DONALD J. QUIGG

Attesting Officer

Commissioner of Patents and Trademarks